United States Patent
Ykema et al.

(10) Patent No.: US 6,320,132 B1
(45) Date of Patent: *Nov. 20, 2001

(54) COMPACT ELECTRICAL BUS

(75) Inventors: John I. Ykema, Broomall, PA (US); John P. Barber, Dayton, OH (US)

(73) Assignee: SPD Technologies, Inc., Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/488,141

(22) Filed: Jun. 7, 1995

Related U.S. Application Data

(63) Continuation-in-part of application No. 07/948,301, filed on Sep. 21, 1992, now Pat. No. 5,936,201.

(51) Int. Cl.$^7$ ................................................. H01B 5/08

(52) U.S. Cl. .................... 174/70 B; 174/68.2; 174/72 B; 174/88 M; 174/98

(58) Field of Search ..................... 174/68.2, 70 B, 174/72 B, 88 B, 99 B, 133 B, 149 B, 71 B, 117 FF

(56) References Cited

U.S. PATENT DOCUMENTS

| | | | |
|---|---|---|---|
| 2,039,793 | * 5/1936 | Harvey | 174/99 B |
| 2,191,645 | * 2/1940 | De Mask | 174/88 B |
| 2,287,502 | 6/1942 | Togesen et al. | 174/68.2 X |

(List continued on next page.)

FOREIGN PATENT DOCUMENTS 1167 430    10/1969    (GB).

OTHER PUBLICATIONS

"GE Spectra Series Busway", Catalog #GET-700SA1190 BLJ, General Electric Company.
"Introducing Plugtrak, A pretty Face With Guts to Match", Catalog #K 10017, Hubbell Incorporated.
"Introducing Plugtrak, The Re-Invention of Surface Raceways", Catalog #K1006, Hubbell Incorporated.
"I–T–E Universal Lighting Duct" Selection & Applicagion Guide, Bulletin 5/1–1E, 1988, Siemens Energy & Automation, Inc.
"I–T–E Industrial Trol–E–Duct", Selection & Application Guide, Bulletin 5.2.1–1C, 1986, Siemens Energy & Automation, Inc.
"I–T–E XL–X Busway Systems", Selection & Application Guide, Bulletin 5.3.5–1D, 1989, Siemens Energy & Automation, Inc.
"I–T–E BD Busway Systems", Selection & Application Guide, Bulletin 5.3.3–1D, 1986, Siemens Energy & Automation, Inc.
"I–T–E XJ–L Busway Systems", Selection & Application Guide, Bulletin 5.3–1D, 1988, Siemens Energy & Automation, Inc.
Product Bulletin—"Speedfax"—ITE Imperial, Mar. 1975.
"Wagner—New A–C Bus Design", pp. 448, 449 & 450, May 1948 Edition of Electrical Engineering.

Primary Examiner—Albert W. Paladini
(74) Attorney, Agent, or Firm—Charles W. Quinn

(57) ABSTRACT

A compact electrical bus for transmission of three-phase electrical power through longitudinally elongated insulatively sandwiched lamina carrying respective power phases. A plurality of electrically conductive longitudinally elongated lamina have transversely off set parts respecting one another and a plurality of electrically conductive longitudinally elongated lamina devoid of offsets. The pluralities of lamina are sandwiched together between layers of insulation. When assembled, offsets of one lamina transversely align in a nested relationship with an off set of a second lamina. The lamina devoid of offsets further nests within the offset of the second lamina.

8 Claims, 25 Drawing Sheets

U.S. PATENT DOCUMENTS

| | | | |
|---|---|---|---|
| 2,350,601 | * | 6/1944 | Frank et al. .................... 174/68.2 X |
| 2,400,223 | * | 5/1946 | Cole et al. ..................... 174/68.2 X |
| 2,482,310 | | 9/1949 | Adam . |
| 3,018,320 | | 1/1962 | Rowe . |
| 3,081,442 | | 3/1963 | Platz . |
| 3,402,255 | | 9/1968 | Parker et al. ........................ 428/595 |
| 3,571,488 | * | 3/1971 | Douglass ............................ 174/68.3 |
| 3,644,663 | * | 2/1972 | Carlson ............................. 174/99 B |
| 3,770,875 | * | 11/1973 | Carlson .......................... 174/68.2 X |
| 3,836,936 | | 9/1974 | Clement . |
| 4,008,365 | | 2/1977 | Carlson ............................... 174/68.2 |
| 4,089,578 | | 5/1978 | Valtonen . |
| 4,112,249 | * | 9/1978 | Carlson ............................... 174/68.2 |
| 4,293,172 | | 10/1981 | Lingaraju . |
| 4,679,884 | | 7/1987 | Klemp . |
| 4,804,804 | * | 2/1989 | Hibbert et al. ...................... 174/68.2 |
| 4,945,188 | * | 7/1990 | Jackson .......................... 174/68.2 X |
| 5,306,165 | | 4/1994 | Nadeau . |

* cited by examiner

COMPACT ELECTRICAL BUS

CROSS-REFERENCE TO RELATED PATENT APPLICATION

This is a continuation-in-part of U.S. patent application No. 07/948,301 filed Sep. 21, 1992, now U.S. Pat. No. 5,936,201, in the name of John I. Ykema and assigned to SPD Technologies Inc.

BACKGROUND OF THE INVENTION—FIELD OF THE INVENTION

This invention relates to electrical power transmission equipment, specifically to three-phase electrical power transmission equipment and to direct current electrical power transmission equipments.

BACKGROUND OF THE INVENTION— DESCRIPTION OF THE PRIOR ART

Means for transmitting three-phase electrical power are known and include conventional lines and cabling used in utility, industrial and nautical applications. Means for transmitting direct current electrical power are also known.

A disadvantage associated with conventional transmission lines is that substantial inductance may be present.

An additional problem inherent in much of the prior art equipment for transmitting three-phase electrical power is lack of impedance balance between phases.

There is a continuing need in heavy duty industrial and nautical applications for three-phase electrical power transmission equipment having a high degree of impedance match among phases while having low inductance. Additionally, there is a continuing need for such equipment in small, light-weight form. Small size and light weight are especially desirable characteristics in three-phase power transmission equipment intended for nautical applications.

There is also a continuing need in heavy duty industrial and nautical applications for direct current power transmission equipment having high efficiency with minimal component costs and exhibiting minimal cost for installation and replacement. Such direct current power transmission equipment should have minimum size, minimum mass and exhibit maximum survivability with low fire hazard in the event of a catastrophe; this is especially desirable for nautical applications.

SUMMARY OF THE INVENTION

In one preferred embodiment this invention provides a bus for transmitting three-phase electrical power having longitudinally elongated insulatively sandwiched lamina for carrying respective power phases with respective phase lamina having substantially equal cross-sectional areas at respective transverse locations within the sandwich.

In another of its aspects in the preferred embodiment this invention provides apparatus for transmitting three-phase electrical power including a sandwich of insulatively layered longitudinally elongated lamina for carrying respective power phases in respective three-phase alternating disposition respecting a vertical direction along a lateral direction within the sandwich.

In yet another of its aspects in a preferred embodiment this invention provides a three-phase electrical power bus which includes a conduit. The bus further includes a plurality of electrically conductive longitudinally elongated members within the conduit. A first one of those members has a central portion and respective extremity portions extending substantially in a vertical direction from the central portion. The extremity portions are respectively offset relative to the central portion along a lateral direction.

Second ones of the elongated members of the plurality of electrically conductive longitudinally elongated members have respective portions offset from one another in the lateral direction by an amount substantially that of the amount of offset of respective first member extremity portions relative to the central portion of the first member.

The bus further includes third ones of the plurality of electrically conductive longitudinally elongated members where the third ones are of length in the vertical direction substantially that of the offset portions of the second ones of the elongated members and of the central and extremity portions of the first one of the elongated members.

In the bus as assembled the second members have respective portions which insulatively overlap the first member central portion on opposite sides. The second member offsets are substantially aligned with respective offsets of the first member so that remaining portions of the respective second members are proximate respective extremity portions of the first member.

Further, in the bus as assembled respective ones of the third members are substantially aligned in the lateral direction with the respective remaining portions of the second members and insulatively sandwich respective remaining extremity portions of the second members between such a respective third member and a respective extremity portion of the first member.

In yet another of its aspects the preferred embodiment of the invention may be considered to provide a bus for transmitting three-phase electrical power which includes a plurality of electrically conductive longitudinally elongated lamina having transversely offset parts respecting one another and a plurality of electrically conductive longitudinally elongated lamina devoid of offsets. When assembled, the bus has lamina of the pluralities nested together with each of the offsets being transversely aligned with an offset of another member of the first plurality and with a lateral extremity of a lamina of the second plurality.

In the embodiment of the invention preferred for carrying three-phase electrical power, the lamina carrying respective phases of the three-phase electrical power are in an overlapping insulated sandwich disposition with lamina carrying each of the phases having substantially equal transverse cross-sectional area proximate the exterior of the lamina sandwich. Similarly, lamina carrying each of the phases have substantially equal transverse cross-sectional area at respective transverse locations within the lamina sandwich. Most desirably, the offsets in the lamina are perpendicular.

When assembled into the bus, the lamina of the second plurality preferably extend transversely to the direction of offset substantially the same length as parts of lamina of the first plurality on respective sides of the offsets. Most preferably, offset of respective parts of the lamina of the first plurality exceeds thickness of the lamina of the first plurality in the direction of offset.

In yet another of its aspects, in the preferred embodiment this invention provides apparatus for connecting respective sections of a bus for transmitting three-phase electrical power where the apparatus includes male and female sections. The male section preferably includes a plurality of longitudinally elongated extendable pins arranged in horizontal and vertical rows for transmitting the respective phases. Pins carrying each of the phases are respectively preferably generally vertically and horizontally adjacent to pins for respectively carrying respective ones of the remaining two phases. The male section preferably further includes manually operable means for extending and retracting the pins into and out of connecting disposition with a female section of the connecting apparatus.

The female section preferably includes spring-loaded or otherwise radially biased radially expandable receptacle members for receiving respective ones of the pins when extended from the male section. The receptacle members are preferably arranged in horizontal and vertical rows for carrying each of the respective phases with receptacle members carrying each of the phases respectively being vertically and horizontally adjacent to receptacles for respectively carrying the respective two remaining phases.

In the preferred embodiment of the connector aspect of the invention the receptacle members preferably comprise a plurality of longitudinally elongated leaves which are circularly arranged about a longitudinal axis and include outwardly facing concavities defining a transverse annular recess around the exterior of the circularly arranged leaves. The receptacle means further preferably include resilient means residing within the recesses for biasing the leaves radially inwardly.

Most desirably, the receptacle members further include sleeves for receiving respective ones of the pins including annular lips around the sleeve exteriors with the leaves having an inwardly curving hook at a longitudinal extremity remote from the male section. The hook engages the exterior lip pf the sleeve.

Desirably, the male section includes sleeves electrically connecting with respective power conductors of the bus, where the pins slidably reside within the sleeves.

In the preferred embodiment of the connection means, the manually operable means for extending and retracting the pins further includes a shaft which is manually rotatable about a transverse axis and means, preferably in the form of two-bar linkage, for converting rotation of the shaft into longitudinal motion and applying such longitudinal motion to the pins to extend or retract the pins according to the direction of rotation of the shaft.

In the preferred embodiment of the connection means, the apparatus may further be considered to include longitudinally elongated extendable male members for carrying each phase of three-phase electrical power, means for extendably engaging and retractably disengaging the male members with and from female members of the connection apparatus, where the female members include spring-loaded means for resiliently releasably receivingly engaging respective male members for transmitting each of the respective phases of three-phase electrical power.

In one of its aspects the subject matter disclosed commonly with the patent application referenced above provides a compact low inductance three-phase electrical bus including an axially elongated conduit. Within the conduit are means dividing the conduit into a number, desirably three, of equiangular axially elongated zones electrically insulated from one another. Within each of the zones are spaced apart axially elongated conductive means for carrying respective phases of three-phase electrical power. The means dividing the conduit into zones is electrically insulative.

In one three-phase embodiment of the apparatus disclosed in the patent application referenced above, the dividing means is an axially elongated Y-shaped insulator in the conduit, with legs of the Y-shape contacting the conduit. When the dividing means is an insulator of the desired Y-shape, the apparatus disclosed in the patent application referenced above, further includes spaced apart axially elongated electrically conductive members lying along the insulator.

Preferably, in the subject matter disclosed in the patent application referenced above the conduit is of circular cross-section. However, the conduit may be of polygonal cross-section. If the conduit is of polygonal cross-section, it preferably is of right polygonal configuration.

When the dividing means is provided as the preferred equiangular Y-shaped insulator, legs of the Y-shape defining the insulator are preferably radially elongated relative to leg thickness.

In the preferred three-phase embodiment apparatus disclosed in the patent application referenced above, the conductive members preferably lie substantially along the legs of the Y-shaped insulator. The conductive members most preferably facingly contact the legs of the Y-shaped insulator. Axially extending surfaces of the radially extending legs of the Y-shaped insulator are preferably generally planar, facilitating facing contact with the conductive members.

Facing surfaces of respective conductive members are preferably spaced from the conduit interior to define at least one axially elongated void within the conduit. Most preferably, a plurality of axially elongated equiangularly shaped voids are defined within the conduit. This facilitates axial routing of axially elongated fiber optic transmission means within the conduit, between the conduit wall and at least one of the axially elongated electrically conductive members.

In the three-phase embodiment of apparatus disclosed in the patent application referenced above, the conductive members may each include two axially elongated conductive portions connected by a portion which is curved respecting the axis of the conduit defining the periphery of the bus.

In the three-phase embodiment of apparatus disclosed in the patent application referenced above, most preferably the insulative dividing means is defined by a single, unitary member. Alternatively, in the three-phase embodiment of the disclosed device, the dividing means may be defined by three identical interchangeable insulative members, each of which includes a base adapted for close fitting contact with the interior of the conduit. Each of the three identical interchangeable members further includes a leg extending radially from the base and a nib at the leg radial extremity remote from the base; desirably, the tips of the respective legs abut one another and are retained together by epoxy or other suitable cement. Optionally, the radially inner extremity of the legs of the respective interchangeable members may be formed into or equipped with nibs. The optional nib optionally engages corresponding nibs of the remaining two insulative members.

Desirably, the bases of the insulative members retain radially outboard extremities of the conductive members on respective sides of the legs of the insulative members, thereby maintaining the conductive members spaced from the conduit.

In another of its aspects, the apparatus disclosed in the patent application referenced above, provides a compact, modular direct current bus including an axially elongated preferably generally rectangular conduit, a pair of axially elongated generally rectangular positive and negative conductive members within the conduit and insulative means for maintaining the conductive members spaced from the conduit and from each other. In one of these alternative embodiments, the insulative-means may include a first axially elongated insulative planar spacer facingly contacting and separating the conductive members one from another. The insulative means may further desirably include a pair of axially elongated second insulative planar spacers facingly contacting the inner surface of the conduit and may yet further include a pair of axially elongated insulative blocks receiving respective edges of the first axially elongated insulative spacer and facingly contacting additional outwardly facing surfaces of the positive and negative conductive members.

In yet a further alternate embodiment, the apparatus disclosed in the patent application referenced above provides a modular direct current bus including the axially elongated conduit and the pair of axially elongated positive and negative conductive members noted immediately above. In this further alternate embodiment, the direct current bus further includes an axially elongated preferably rectangular conductive member between the positive and negative conductive members. In such case, the insulative means, for maintaining the conductive members spaced from the conduit and from each other, includes axially elongated insulative planar spacer members which facingly contact and separate the conductive members one from another and from the conduit. The insulative means yet further includes a pair of axially elongated insulative blocks engaging respective edges of at least one of the axially elongated planar spacer members and facingly contacting surfaces of the positive and negative conductive members which are distinct from the surfaces contacted by the planar spacer members.

In both of the direct current bus embodiments of the apparatus disclosed in the patent application referenced above, and in the direct current bus embodiment disclosed herein there may optionally be provided axially elongated fiber optic cable within the conduit. Desirably, the fiber optic cable resides within one or more axially elongated passageways resulting from transverse length of the insulative members being less than the combined transverse length of the conductive members.

In the direct current embodiments of the apparatus disclosed in the patent application referenced above and disclosed herein, the conduit is preferably generally rectangular.

Figure 1:
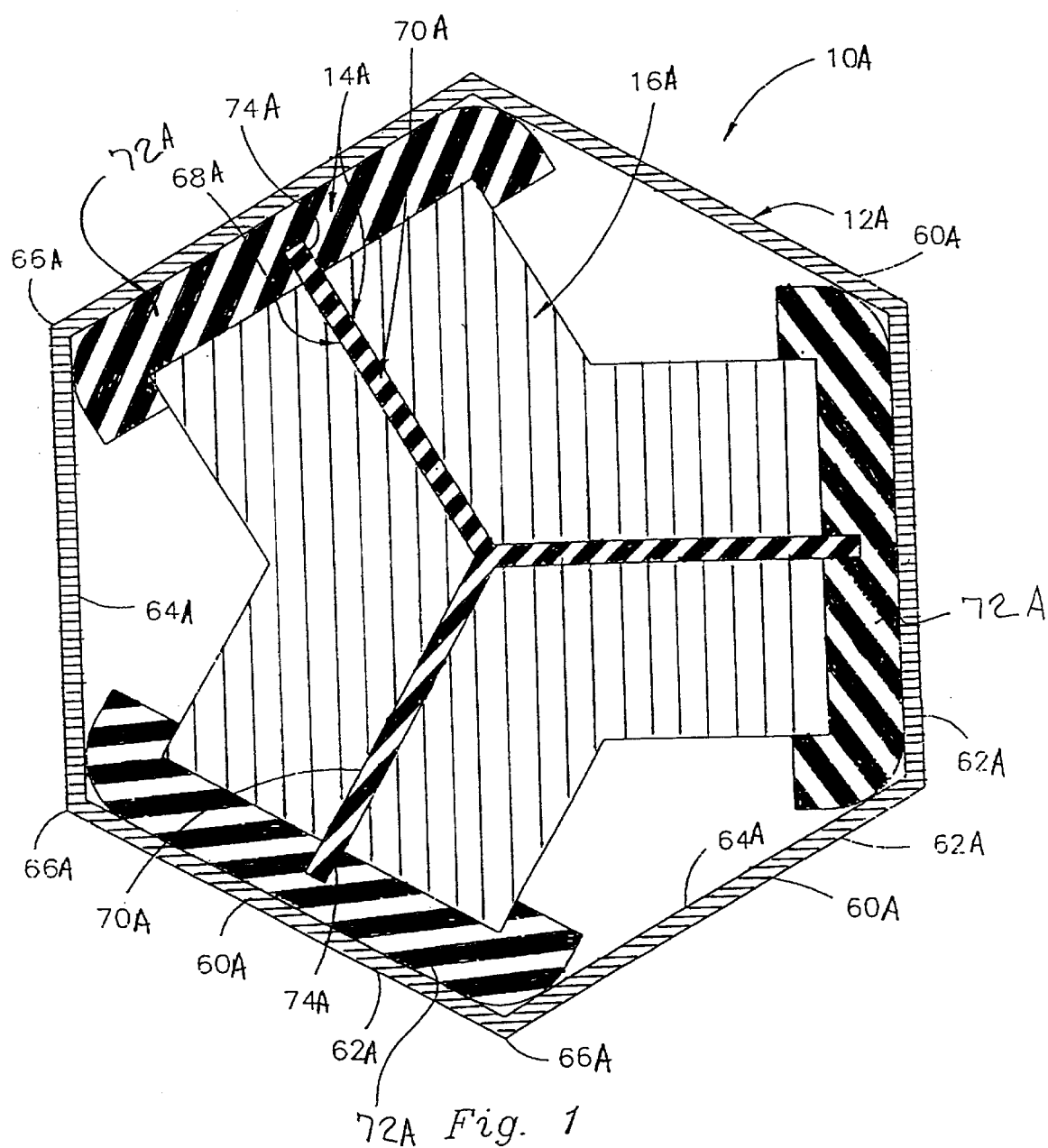
FIG. 1 is shared commonly with the parent application referenced above and is a schematic axial cross-sectional view of one embodiment of an electrical bus for carrying three-phase electrical power, manifesting inventive aspects.

Numbers in the drawings correspond to numbers in the following description. In the drawings, effort has been made to utilize the practice whereby components in the preferred embodiments are identified with numbers, e.g. 6, which do not have any alphabetic indicators. Embodiments and components which are other than the preferred embodiments are identified by numbers having alphabetic indicators therewith, e.g. 6b.

DESCRIPTION OF THE PREFERRED EMBODIMENTS AND BEST MODE KNOWN FOR PRACTICING THE INVENTION

Referring to FIG. 1, one embodiment of a compact low inductance electrical bus for carrying three-phase electrical power is shown in section and is designated generally 10A. Bus 10A includes an axially elongated conduit 12A and means for dividing conduit 12A into three equiangular axially elongated zones which are electrically insulated from one another.

In FIG. 1, conduit 12A is generally hexagonal. Conduit dividing means is provided by an insulator assembly designated generally 14A. Also included as a portion of bus 10A are spaced apart, axially elongated conductive means, designated generally 16A in FIG. 1, for carrying respective phases of three-phase electrical power.

In the embodiment illustrated in FIG. 1, conduit 12A is defined by six planar sides, each of which is designated generally 60A, with the six sides together defining a hexagonal cross-section for conduit 12A. Each planar side 60A has an outwardly facing surface 62A and an inwardly facing surface 64A. Adjacent planar sides of conduit 12A adjoin one another at vertices 66A.

In the FIG. 1 embodiment, insulator assembly 14A is in part defined by a Y-shaped member 68A which includes three equal length radially extending legs 70A positioned equiangularly apart so that any two legs 70A subtend an angle of 120 degrees therebetween.

Insulator assembly 14A further includes three identical base members 72A, each of which facingly contacts one of inwardly facing surfaces 64A of a side 60A. Each base 72A includes a groove 74A for close-fitting receipt of a radial extremity of a leg 70A of Y-shaped member 68A. As shown in FIG. 1, the legs 70A of insulator assembly 14A may be defined by a single integral member.

Figure 2:
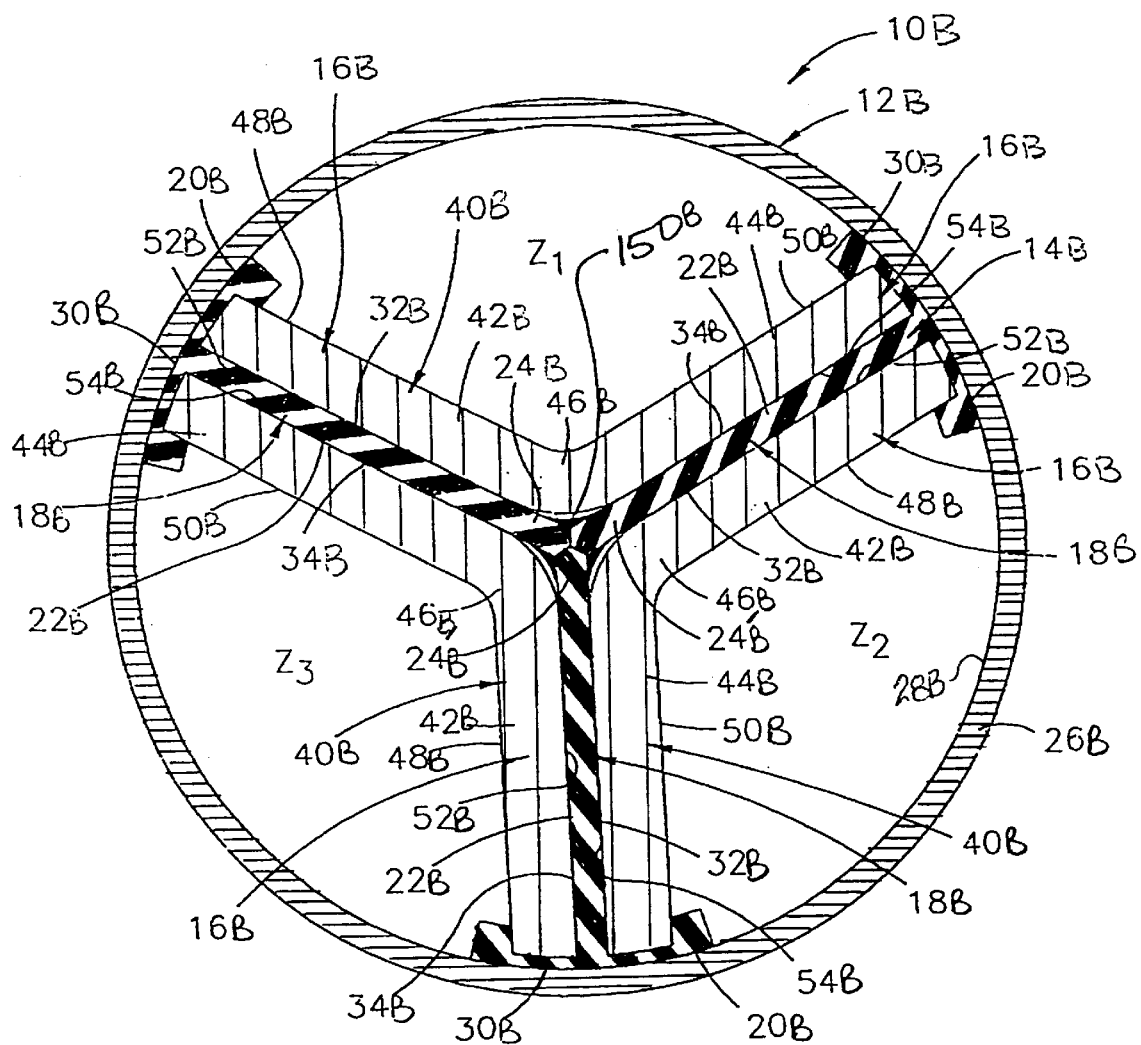
FIG. 2 is shared commonly with the parent application referenced above and is an axial cross-sectional view of an electrical bus for carrying three-phase electrical power, manifesting inventive aspects.
Figure 3:
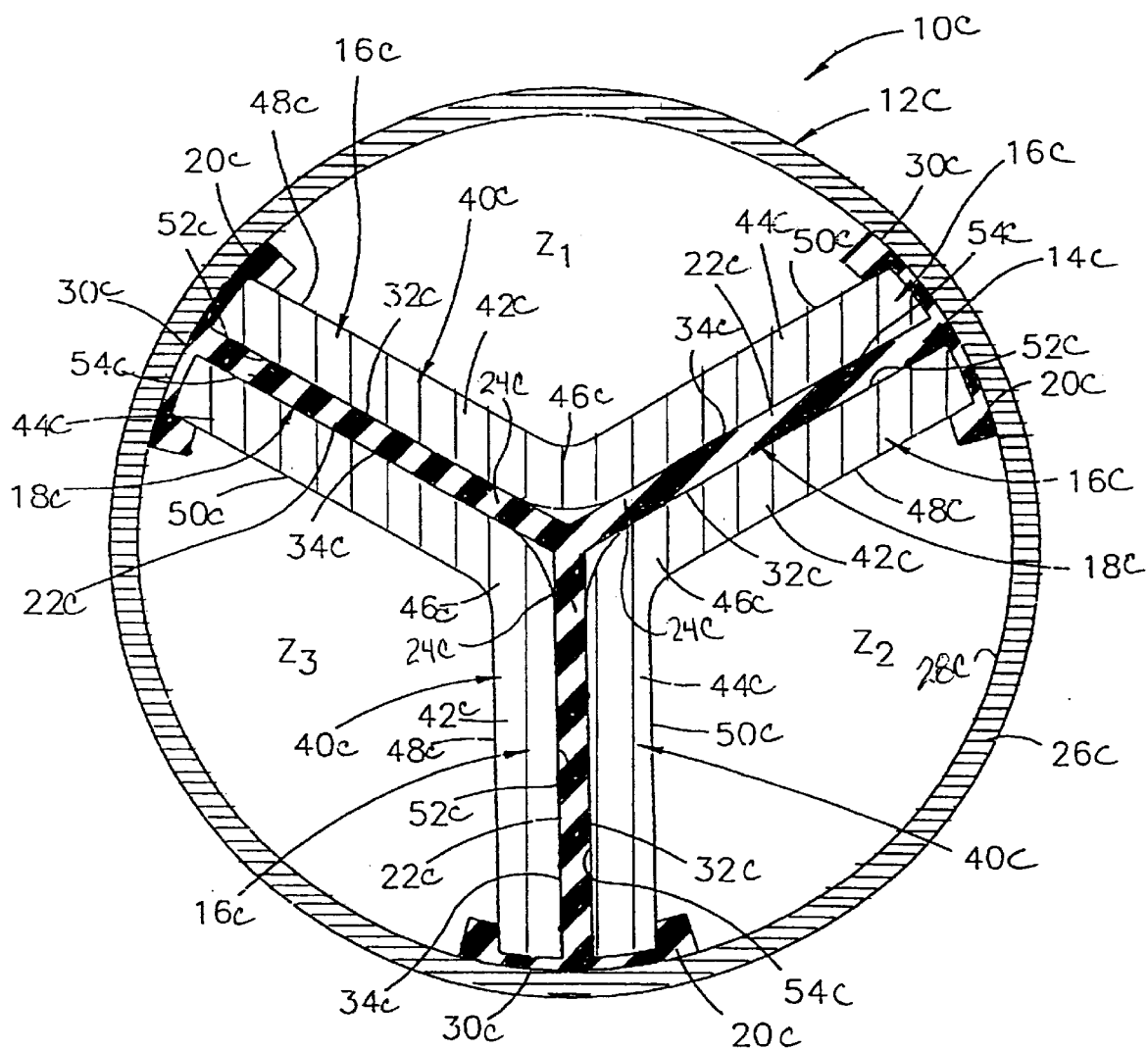
FIG. 3 is shared commonly with the parent application referenced above and is an axial cross-sectional view of another electrical bus for carrying three-phase electrical power, similar to that shown in FIG. 2.
Figure 4:
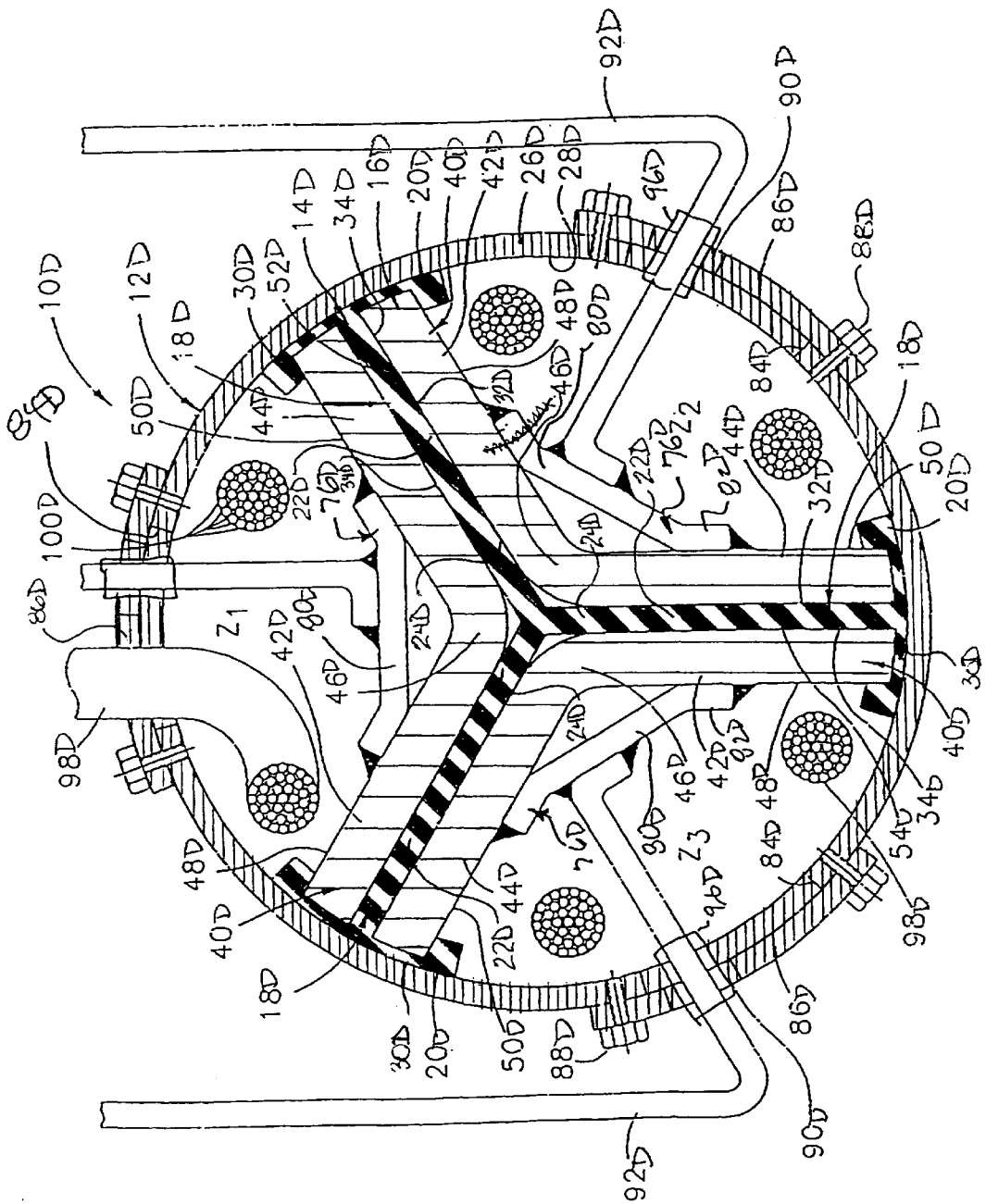
FIG. 4 is shared commonly with the parent application referenced above and is an axial cross-sectional view of the an embodiment of an electrical bus for carrying three-phase electrical power shown in FIG. 3, including breakout structure for carrying electrical power through the conduit wall of the bus.

Referring generally to FIGS. 2, 3 and 4, another embodiment of a compact low inductance electrical bus for carrying three-phase electrical power is shown in section and designated generally 10B,C or D. Bus 10B,C or D includes an axially elongated conduit 12B,C or D and means for dividing conduit 12B,C or D into three axially elongated equiangular zones which are electrically insulated from one another. In FIGS. 2, 3 and 4, the conduit dividing means is provided by insulative means, defined by an insulator designated generally 14B,C or D. Insulator 14B is illustrated in FIG. 2 as being defined by an assembly of three identical parts; insulator 14C, D is illustrated in FIGS. 3 and 4 as being defined by a single integrally formed part.

Also included as a portion of bus 10B,C or D are spaced apart axially elongated conductive means, designated generally 16B,C or D in FIGS. 2, 3 and 4, for carrying respective phases of three-phase electrical power.

Conduit 12B,C or D has circular periphery and a uniform thickness wall. Conduit 12B,C or D is shown in cross-section in FIGS. 2, 3 and 4.

Insulator 14B,C or D is axially elongated, in the direction perpendicular to the plane of the paper in FIGS. 2, 3 and 4. Insulator 14B,C or D is equiangularly Y-shaped, as illustrated in FIGS. 2, 3 and 4, and divides conduit 12B,C or D into the three axially elongated zones which are electrically insulated from one another. The axially elongated zones defined by insulator 14B,C or D within conduit 12B,C or D are designated $Z_1$, $Z_2$ and $Z_3$ respectively in FIGS. 2, 3 and 4.

Insulator 14B,C or D, whether in the assembly embodiment illustrated in FIG. 2 where three identical, separate and interchangeable insulator members define the insulator 14B or whether in the integral embodiment illustrated in FIGS. 3 and 4 where the insulator 14C, D is a single integral piece, may be considered to include three insulator members each of which is designated 18B (or 18C, or 18D as appropriate) in FIGS. 2, 3 and 4. Each insulator member 18B, C or D includes a base 20B, C or D, a leg 22B, C or D extending radially inwardly from base 20B, C or D and a tip 24B, C or D. The tips 24B, C or D are somewhat pointed and abut one another at angles of substantially 120°.

Optionally, in the assembly embodiment illustrated in FIG. 2, each insulator member may include a nib at the radially inboard extremity of a respective leg 22B. Each nib may be adapted for engagement with nibs of the respective two remaining insulator members 18B such that the three insulator members 18B lockingly engage one another at the nibs along the axis of conduit 12B.

Alternatively, the tapered tips (or the optional nibs) may be secured together using suitable glue or cement designated generally 150B in FIG. 2.

In the construction illustrated in FIGS. 3 and 4, insulator 14C or D may be formed as a single extruded member 18C or D with the three legs 22C or D joined together (at the position of convergence defined by the leg tips 24B in the embodiment illustrated in FIG. 2.) Forming insulator 14C or D in a single piece such as by extrusion may yield substantial manufacturing efficiencies by reducing the need for manual application of cement 150B to the tips 24C or D or optional nibs of the insulator members 18C or D.

As illustrated in FIGS. 2, 3 and 4, conduit 12B, C or D has an annular wall 26B, C or D of substantially constant thickness around the entire three hundred sixty degree circle defining conduit 12B, C or D. As a result, an inner surface 28B, C or D of wall 26B, C or D is arcuate and concave.

Each base 20B, C or D of an insulator member 18B, C or D has a surface 30B, C or D which is radially convex and formed for complemental facing contact with inner surface 28B, C or D of conduit wall 26B, C or D. Each radially outwardly facing surface 30 B, C or D of a base 20B, C or D is axially elongated, as are the remainder of the associated insulator member 18B, C or D. Accordingly, insulator members 18B, C or D extend axially continuously substantially the axial length of bus 10B, C or D within conduit 12B, C or D; insulator members 18B, C or D are not intermittent or only periodically positioned along the axis of conduit 12B, C or D. As a result, there is substantially no communication between zones $Z_1$, $Z_2$ and $Z_3$.

Each leg 22B, C or D of an insulator member 18 is radially elongated relative to its thickness, i.e. each leg 22 extends further in the radial direction than its thickness shown in section in FIGS. 2, 3 and 4. Each leg 22B, C or D includes respective axially elongated surfaces 32B, C or D, 34B, C or D, both of which are generally planar. The planes defining surfaces 32B, C or D, 34B, C or D are desirably parallel so that each leg 22B, C or D is of substantially constant thickness in the radial direction.

Each optional nib at a radially inboard extremity or tip 24B of a leg 22B may further optionally include a tongue and a groove, with the groove being sized and shaped to receive a tongue from a corresponding, interchangeable insulator member 18B positioned so that an angle of substantially one hundred twenty degrees is subtended by the two engaging insulator members 18B.

Conductive means 16B, C or D lies along insulator 14B, C or D and further includes three spaced apart axially elongated electrically conductive members 40B, C or D. Each conductive member 40B, C or D facingly contacts respective surfaces 32B, C or D, 34B, C or D of respective legs 22B, C or D of two adjacent and structurally connected insulator members 18B, C or D.

Each conductive member 40B, C or D may lie substantially along the entire radial lengths of legs 22B, C or D of the two adjacent insulator members 18B, C or D.

Each conductive member 40B, C or D includes two axially elongated portions 42B, C or D, 44B, C or D connected by a portion 46B, C or D which is convexly curved respecting the radial direction, as illustrated in FIGS. 2, 3 and 4.

While reference is made to various portions of conductive member 40B, C or D, such as "two axially elongated portions 42B, C or D, 44B, C or D", member 40B, C or D is typically a single piece such as an extrusion formed to shape or a flat bus bar which has been formed to the shape illustrated in FIGS. 2, 3, and 4.

Each base 20B, C or D of an insulator member 18B, C or D includes two axial grooves formed therein receiving radially outboard extremities of respective conductive members 40B, C or D as shown in FIGS. 2, 3 and 4. The grooves, which are generally axially elongated, in bases 20B, C or D of insulator members 18B, C or D and the radially outboard extremities of conductive members 40B, C or D, have not been numbered in FIGS. 2, 3 and 4 to improve drawing clarity.

First and second axially elongated portions 42B, C or D, 44B, C or D of each conductive member 40B, C or D include surfaces 48B, C or D, 50B, C or D facing one another. Surfaces 48B, C or D, 50B, C or D are spaced from conduit 12B, C or D to define, together with inner surface 28B, C or D of wall 26B, C or D of conduit 12B, C or D, an axially elongated void or zone $Z_1$ (or $Z_2$ or $Z_3$) within conduit 12B, C or D.

Each conductive member 40B, C or D also includes surfaces 52B, C or D, 54B, C or D which may be considered convexly facing surfaces. Surfaces 52B, C or D, 54B, C or D do not face one another, but rather facingly contact surfaces 32B, C or D, 34B, C or D of respective legs 22B, C or D of insulator members 18B, C or D. Surfaces 52B, C or D, 54B, C or D on each conductive member 40B, C or D have been numbered in FIG. 2, but have not been numbered in FIGS. 3 and 4 to improve drawing clarity.

Each conductive member 40B, C or D may have a larger, or a smaller, cross-section in the axial direction illustrated in FIGS. 2, 3 and 4, than an insulator member 18B, C or D. Similarly, each of first and second axially elongated portions 42B, C or D, 44B, C or D of each conductive member 40B, C or D may have a larger, or a smaller, cross-section in the axial direction than does an insulator member 18B, C or D. The relative sizes and specifically the relative cross-sectional areas in the axial direction of the conductive and the insulative members depends on the voltage and current characteristics of power to be carried by the bus.

Bonding may be provided at the interface of conductive member 40B, C or D and insulator 14B, C or D. Such bonding desirably eliminates any air voids which, if present, could lead to corona thereacross. Respecting the cement 150B used to secure tips 24B together in the embodiment illustrated in FIG. 2, an insulating compound may be used at such locale to eliminate air space by filling the volume around the tips.

Referring to FIG. 4, breakout structure is provided for electrically connecting bus conductive members 40D to a supply of three-phase electrical power or to a device using three-phase electrical power. As best illustrated in FIG. 4, the breakout structure includes connector flanges 76D which are welded to respective conductive members 40D; suitable weldments are shown but not numbered in FIG. 4. Optionally (but less desirably) bolts may be used to hold flanges 76D in place by engaging tapped holes in respective first and second axially elongated portions 42D, 44D of conductive members 40D. The welding, or the less desirable bolt arrangement, assures good electrical contact between connector flanges 76D and an associated conductive member 40D. When bolts are used, in addition to threadedly engaging tapped holes formed in conductive members 40D, the bolts should be welded to connector flanges 76D.

Each connector flange 76D desirably includes end portions which are substantially flat and adapted for facing contact with respective concavely facing surfaces 48D, 50D of associated conductive member 40D. These end portions of each connector flange 76D have not been numbered in the drawings, to avoid excess drawing clutter.

Each connector flange 76D yet further includes a central portion 80D spaced away from the curved central portion 46D of an associated conductive member 40D and connected to the extremities of connector flanges 76D by intermediate bar portions 82D. Connector flanges 76D are somewhat axially elongated.

At the vicinity of each connector flange 76D, conduit 12D has an axially elongated opening 84D formed therein. Opening 84D is positioned to be substantially radially outboard of central portion 80D of a connector flange 76D. As illustrated in FIG. 4, each opening 84D is covered by a plate 86D secured in place over opening 84D via bolts 88D threadedly engaging unnumbered tapped holes in the wall of conduit 12D. Cover plate 86D is curved to conform to the curved outer surface of conduit 12D.

Cover plates 86D have openings 90D formed therein for passage therethrough of connector rods 92D affixed and electrically connected to flanges 76D by welding, as illustrated; connector rods 92D may also be bolted to flanges 76D. Connector rods 92D are insulated from the wall 26D of conduit 12D by suitable doughnut-shaped insulators 96D which fit about connector rods 92D much in the form of grommets, as illustrated in FIG. 4. Alternatively, connector rods 92D may be insulated from conduit 12D at openings 90D by suitable insulators which are attached to cover plates 86D and are formed about the inside surface of openings 90D.

Connector rods 92D may be insulated outside of bus 10D, depending on the level of voltage in the connector rods.

Connector rods 92D connect with flanges 76D proximate the midpoint of the flanges 76D so that power is delivered by the connector rods 92D substantially equally to respective first and second axially elongated portions 42D, 44D of a conductive member 40D. Openings 90D in cover plates 86D overlie openings 84D in conduit 12D and are of sufficient size that connector rods 92D and their doughnut-like insulators 96D may pass therethrough without contact (and resultant electrical connection) of the connector rods 92D with the peripheries of openings 90D.

Still referring to FIG. 4, the connector flanges 76D are shaped so that outboard portions thereof facingly contact respective first and second axially elongated portions 42D, 44D of an associated conductive member 40D close to the midpoints of portions 42D and 44D. Connector flange 76D is shaped so that the central portion thereof is somewhat proximate to but yet still spaced from curved portion 46D of an associated conductive member 40D.

The shape of connector flanges 76D, as illustrated in FIG. 4, permits axial routing of fiber optic cables within axially elongated zones $Z_1$, $Z_2$ and $Z_3$. The fiber optic cables are designated generally 98D and include a number of fiber optic strands or filaments 100D bundled together.

As illustrated in FIG. 4, a fiber optic cable 98D may pass through an opening 84D to enter an appropriate zone such as zone $Z_1$. Cover plate 86D may have a second opening to permit a fiber optic cable 98D to pass therethrough into a desired axially elongated zone within conduit 12D.

Figure 5:
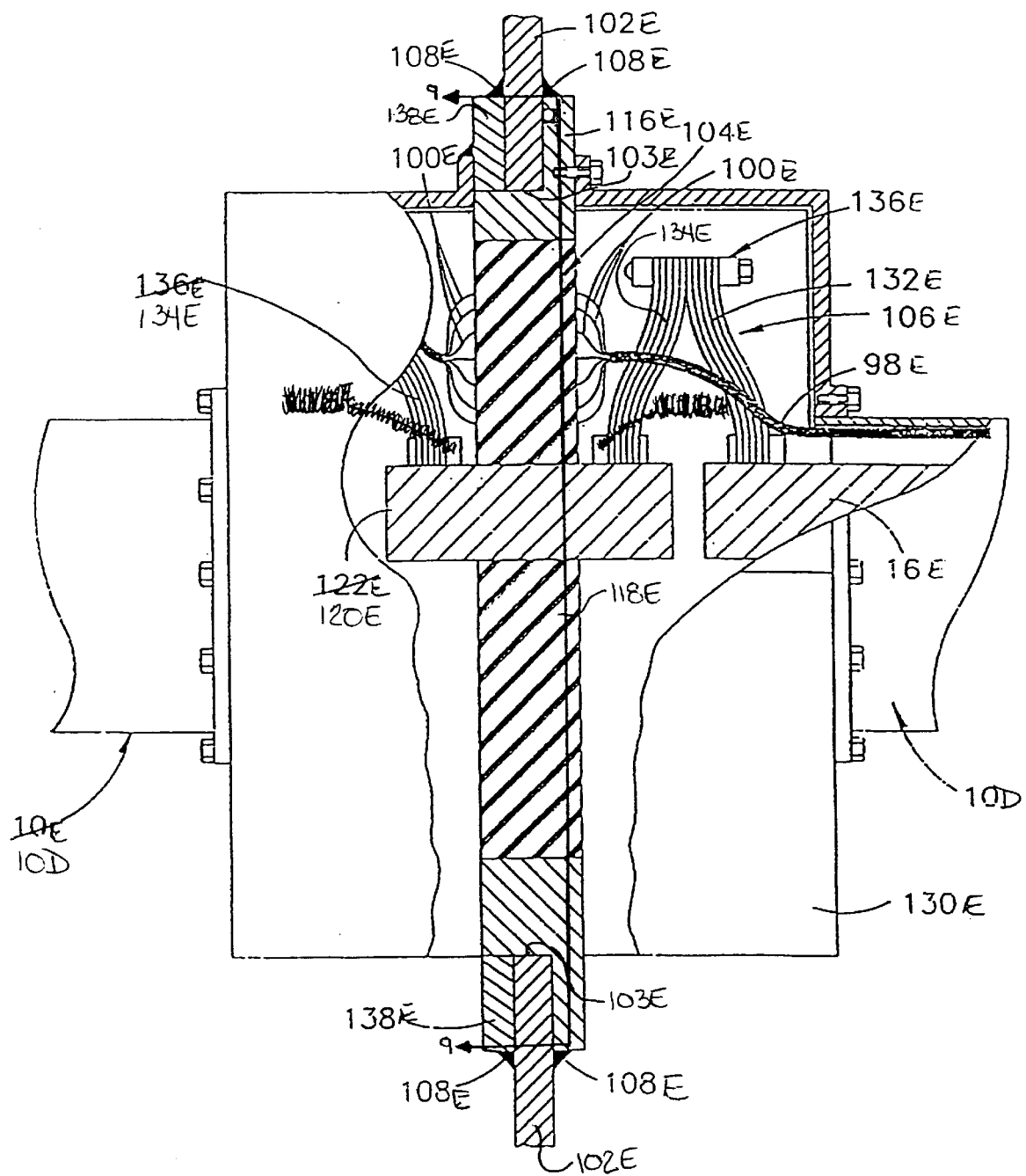
FIG. 5 is shared commonly with the parent application referenced above and is a side view, partially broken away and partially in section, illustrating structure facilitating passage through a structural wall of an electrical bus for carrying three-phase electrical power which includes fiber optic transmission lines, as shown generally in FIG. 4.
Figure 6:
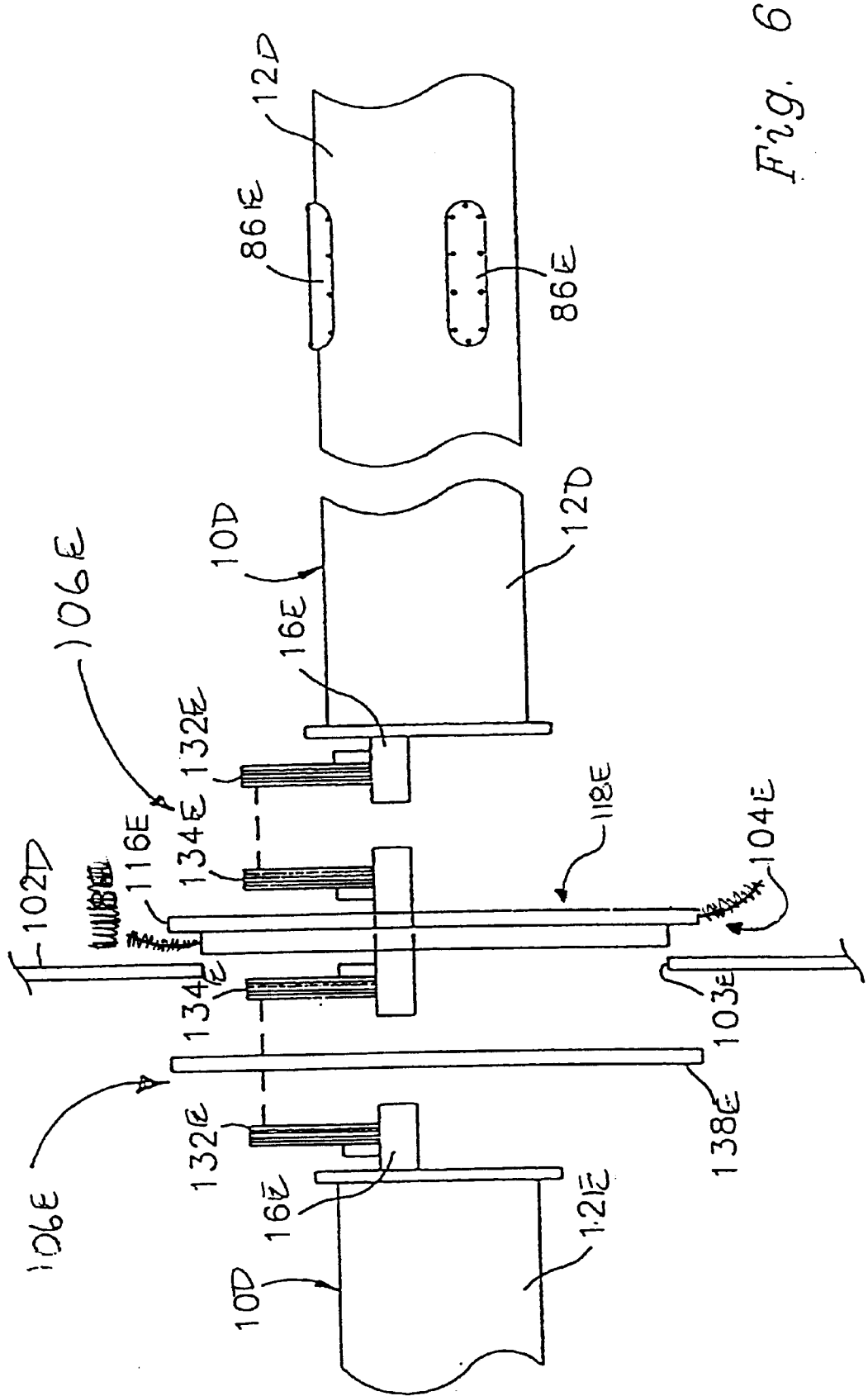
FIG. 6 is shared commonly with the parent application referenced above and is an exploded side view of the structure facilitating passage through a structural wall of an electrical bus, as shown generally in FIG. 5 but without fiber optic transmission lines.

Structure utilized to permit electrical connection of two segments of a three-phase electrical bus through a structural wall is illustrated in FIGS. 5 and 6. Structural wall or bulkhead 102E has an opening cut therethrough with the periphery of the opening designated 103E in FIG. 5.

A bonded insulative member designated generally 104E in FIG. 5 is fitted into the opening in wall or bulkhead 102E. Bonded insulative member 104E is illustrated in greater detail in FIG. 9 and includes a support ring 116E, which is typically metal, with insulator material 118E bonded to and within support ring 116B. Support ring 116E is welded to wall or bulkhead 102E via welds 108E illustrated in FIG. 5.

Figure 9:
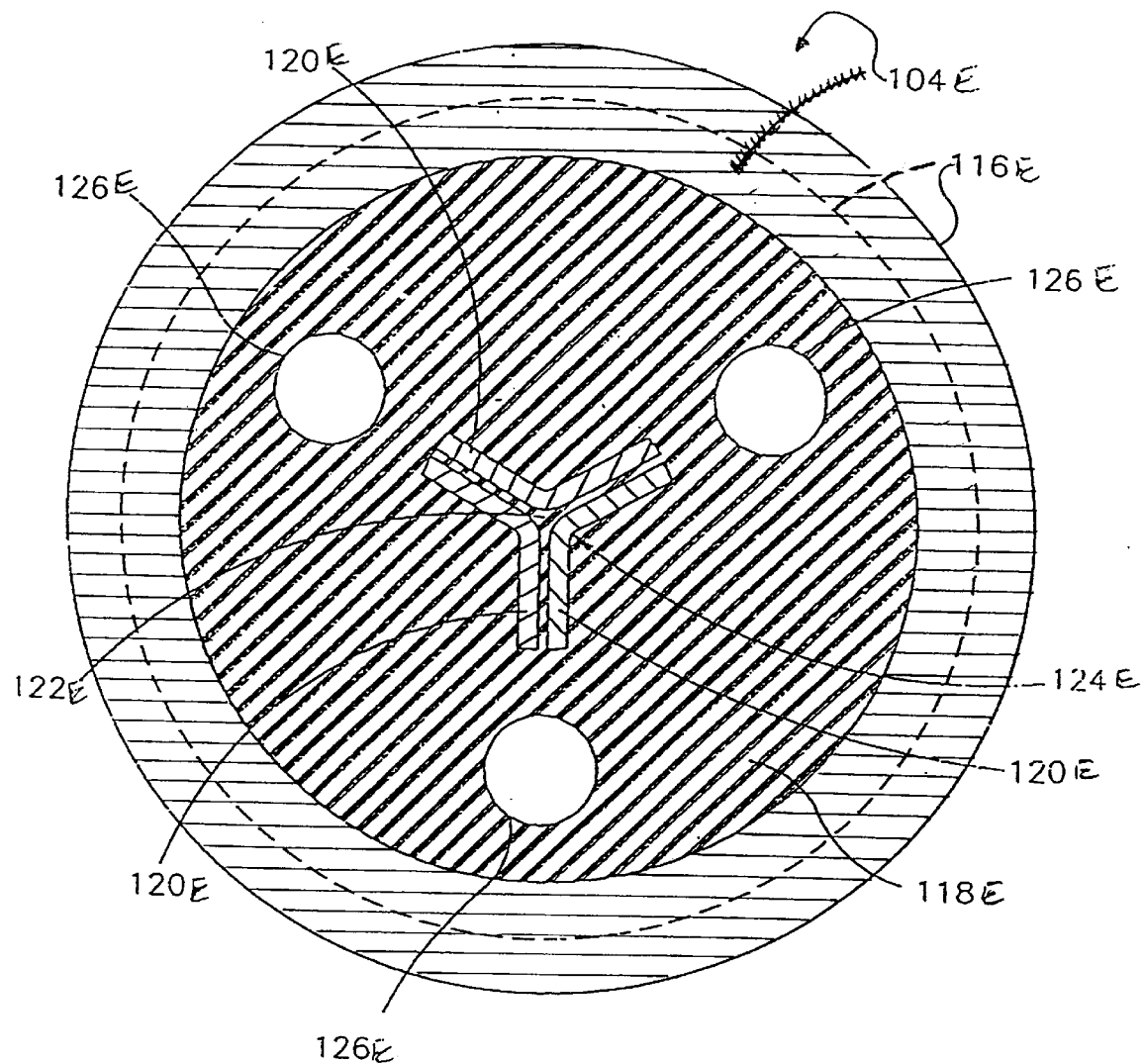
FIG. 9 is shared commonly with the parent application referenced above and is a simplified sectional view taken at lines and arrows 9—9 in FIG. 5.
Figure 10:
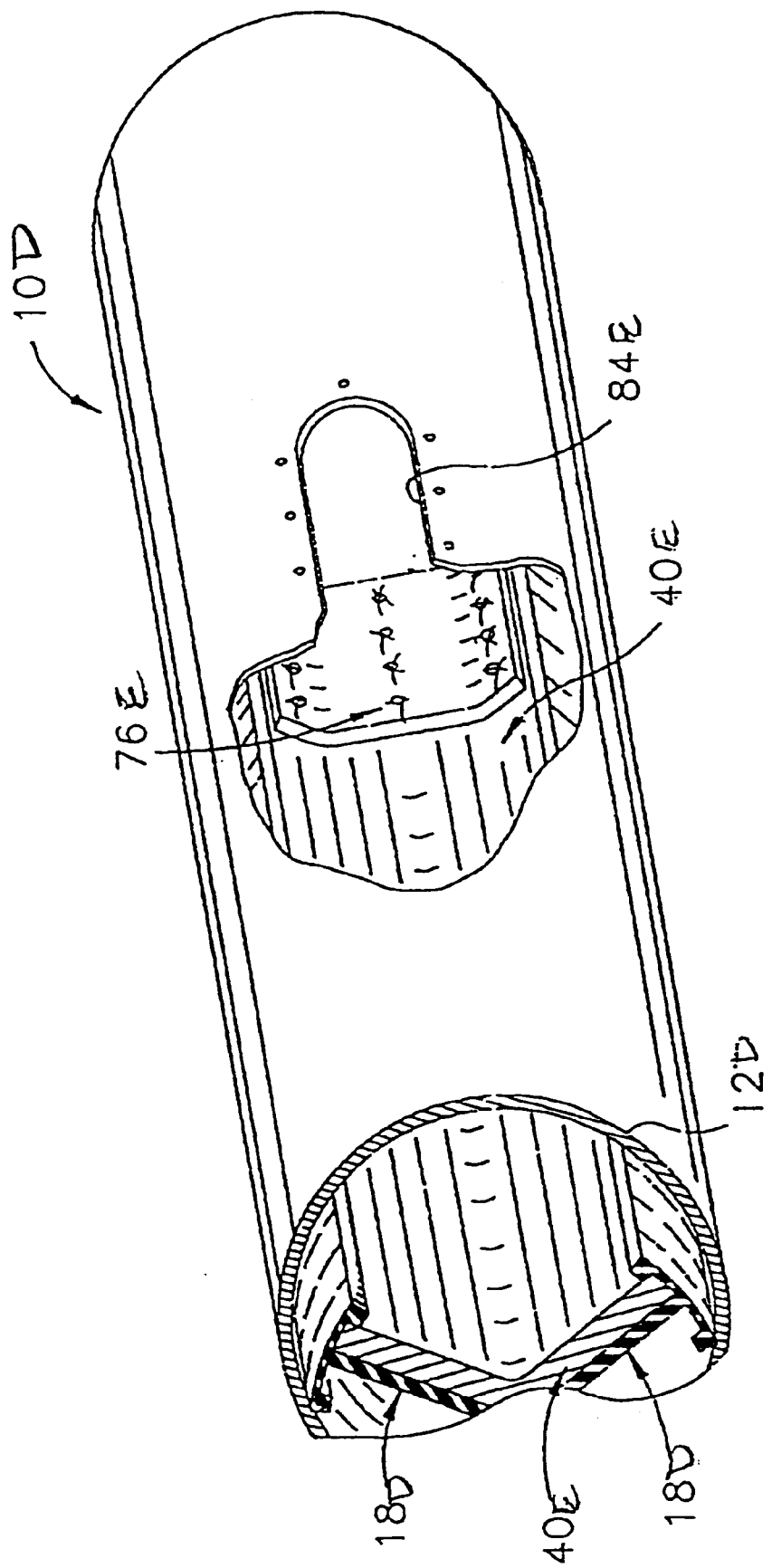
FIG. 10 is shared commonly with the parent application referenced above and is a partially broken isometric view of an electrical bus, illustrating a portion of the breakout structure shown in FIG. 4.

Referring generally to FIG. 9, bonded insulative member 104E further includes three conductive members 120E positioned at the center thereof and spaced from one another by insulator material 118E. Conductive members 120E and insulator material 118E are bonded together as insulator material 118E is fabricated within ring 116E. Conductive members 120E are generally of the same size and cross-sectional shape as conductive members 40B, C or D of bus 10B, C or D. The portion of insulator material 118E which separates respective conductive members 120E is substantially the same size and cross-section as insulator assembly 14B, C or D within bus 10B, C or D. Conductive members 120E, together with the portions of insulator material 118E between respective conductive members 120E, define a bus feed-through member.

Bonded insulative member 104E yet further includes one or more fiber optic feedthrough panels. Three of these panels are illustrated schematically as circles in FIG. 9 and have been designated generally 126E.

Once bonded insulative member 104E is in place in wall or bulkhead 102E, electrical connection is affected between respective conductive members 40B, C or D of bus 10B, C or D and conductive members 120E of bonded insulative member 104E via flexible strands 132E and 134E. Flexible strands 132E and 134E are electrically connected, such as by welding, to radial extremities of conductive members 40B, C or D and 120E, with a separate conductive strand being welded to each of the respective radial extremities of conductive members 40B, C or D and 120E as depicted schematically in FIG. 6.

Optionally, an insulated box or container 130E may be provided around the connections between bus 10B, C or D and bonded insulative member 104E. Box or housing 130E may desirably be bolted in place as illustrated in FIG. 5.

FIG. 6 further illustrates the manner in which two sections of bus 10B, C or D are connected through structural wall or bulkhead 102E. In FIG. 6, the character of bonded insulative member 104E is illustrated whereby member 104E includes support ring 116E and insulator material 118E. Support ring 116E is of larger outer diameter than insulator material 118E.

In FIG. 6, strand members forming a portion of a flexible coupler 106E are illustrated. First strands 132E connect, such as by welding, to respective conductive members 40B, C or D of bus 10B, C or D and extend radially from the respective conductive members 40B, C or D to which first strands 132E are connected. Second strands 134E are connected, such as by welding, to respective conductive members 120E forming a portion of bonded insulative member 104E. Second strands 134E similarly extend radially from the respective conductive member 120E to which they connect. Respective first and second strands 132E, 134E are angularly aligned due to the substantial alignment of respective conductive members 40E defining zones $Z_1$, $Z_2$ and $Z_3$ with respective conductive members 120E forming component parts of insulative member 104E.

Respective co-angularly positioned first and second strands 132E, 134E are connected together via a bolting connector 136E as illustrated generally in FIG. 5. The connection provided by bolting connector 136E is along the dotted line connecting first and second strands 132E, 134E in FIG. 6. Bolting connector 136E has not been illustrated in FIG. 6 to assure drawing clarity. While only one pair of connected strands 132, 134 is shown in FIG. 6, it is to be understood that similar pairs of connected strands are provided for each of the respective angularly spaced, axially aligned sets of conductive members 40B, C or D and 120E.

Further provided as a portion of the structure via which two segments of bus 10B, C or D may be connected is a separate, second support ring 138E shown in FIGS. 5 and 6. Second support ring 138E is of substantially the same diameter as support ring 116E forming a portion of bonded insulative member 104E. Second support ring 138E has sufficiently large inner diameter that bolting connection between first and second strands 132E, 134E, to the left of wall 102E in FIG. 6, may be affected without contact with the inner periphery of second support ring 138E.

Respective first and second strands 132E, 134E, which are connected by bolting connector 136E, are angularly aligned with respect to the centerline of the conduit; this results from the substantial angular alignment of respective conductive members 40B, C or D in zones $Z_1$, $Z_2$ and $Z_3$ with corresponding conductive members 120E of bonded insulative member 104E.

Box or housing 130E may be split substantially along a horizontal plane passing through the center of bus 10B, C or D.

Figure 7:
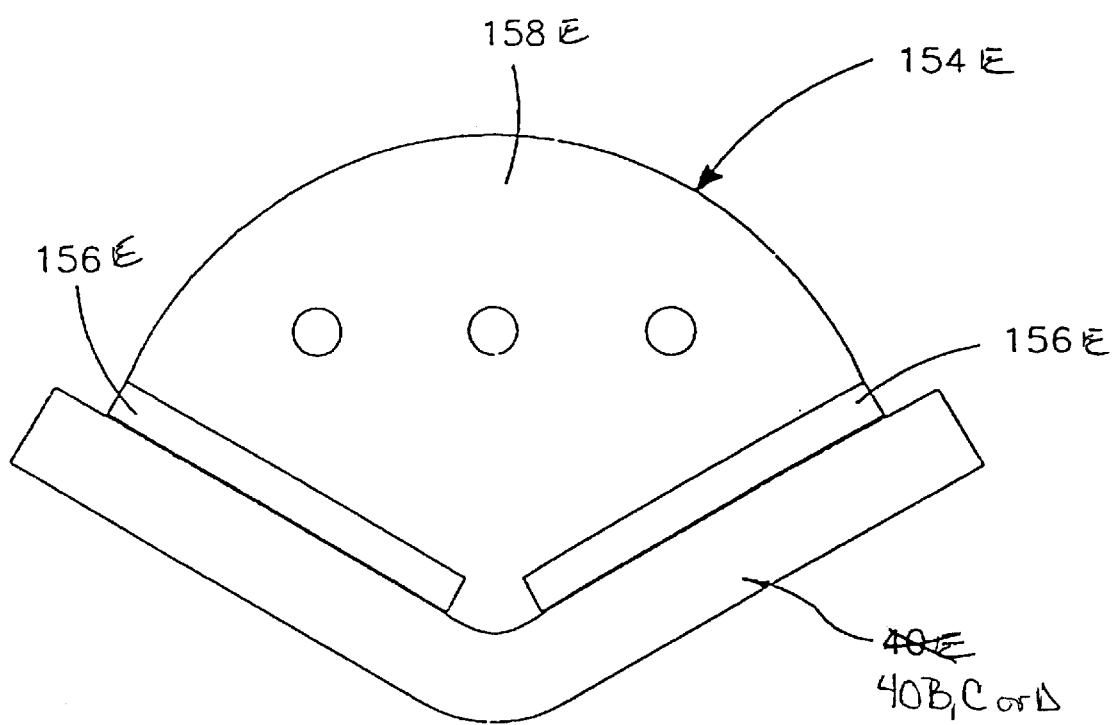
FIG. 7 is shared commonly with the parent application referenced above and is a front view of a component of structure facilitating passage of the electrical bus through the structural wall illustrated in FIGS. 5 and 6.

FIG. 7 illustrates an end connector for bus 10B, C or D. The end connector is designated generally 154E and is formed as a single integral piece. End connector 154E includes two feet 156E which are typically welded to conductive member 40B, C or D. End connector 154E further includes a flange portion 158E having apertures formed therein with flange 158E being of planar configuration and generally perpendicular to feet 156E. Flange 158E and the apertures therein, extending in an upstanding position from conductive member 40B, C or D, facilitates attachment of a suitable strand 132E and electrical connection thereof to conductive member 40B, C or D by either welding or bolting.

Figure 8:
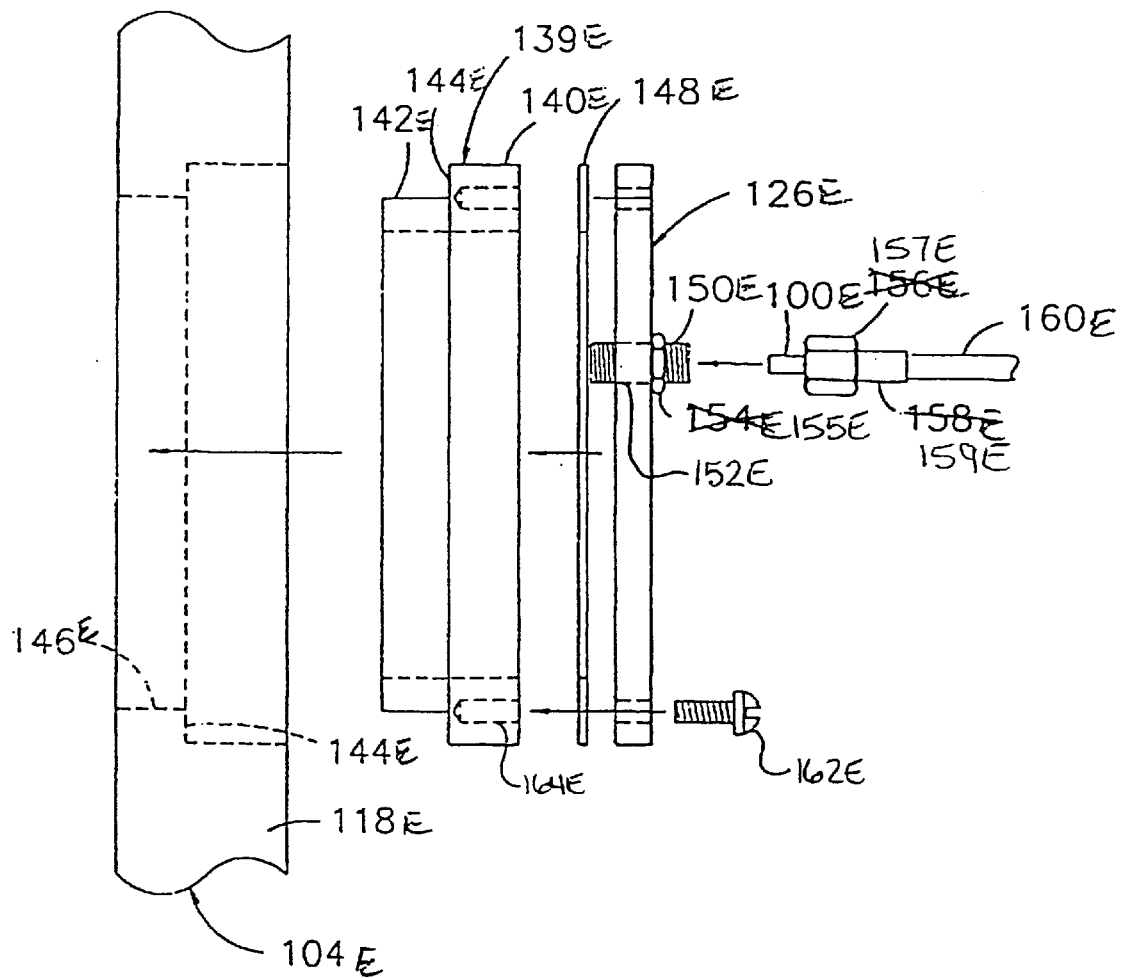
FIG. 8 is shared commonly with the parent application referenced above and is an enlarged broken exploded detail view of a portion of FIG. 5, illustrating a fiber optic cable optionally forming a portion of an electrical bus and showing the manner in which the fiber optic cable passes through a structural wall with the electrical bus.

FIG. 8 illustrates an assembly, referred to generally as a fiber optics panel mounting assembly, facilitating passage of one or more of fiber optic cables through the structural wall or bulkhead 102E when fiber optic cables are provided as a portion of bus 10B, C or D. In FIG. 8, the insulator material portion 118E of bonded insulative member 104E is illustrated. As further shown in FIG. 8, a fiber optics panel mounting member 139E includes first and second panel mounting member portions 140E, 142E where first panel mounting member portion 140E is of larger size about its periphery than second panel mounting member portion 142E. The disparity in size between first and second panel mounting member portions 140E, 142E results in a shoulder 144E being defined by an inwardly facing surface of first panel mounting member portion 140E.

Fiber optics panel mounting member 139E is desirably molded in place in insulator material 118E when bonded insulative member 104E is fabricated. The shoulder configuration provided by first and second panel mounting portions 140E, 142E assures that fiber optics panel mounting member 139E will be securely retained when it is molded in place in insulator material 118E when bonded insulative member 104E is fabricated.

Feedthrough panel 126E includes a series of tapped holes 152E for receiving threaded fitments 150E illustrated in FIG. 8. Fitments 150E desirably have external threads for engagement with not only tapped holes 152E in feedthrough panel 126E, but also for engagement by locking nuts 155E and retention nuts 157E illustrated in FIG. 8. Retention nuts 157E are rotatably mounted on collars 159E fitted about sheaths 160E surrounding fiber optic strands 100E.

A gasket 148E effectuates a seal between feed-through panel 126E and panel mounting member 139E when feed-through panel 126E is secured against member 139E with suitable bolts 162E. Feedthrough panel 126E sandwiches gasket 148E against panel mountning member 139E as a result of rotation of bolts 162E engaging tapped holes 164E in panel mounting member 139E, as illustrated in FIG. 8.

In the above embodiments of the bus 10A, B, C or D for carrying three-phase electrical power, the conduit 12A, B, C or B may be fabricated of steel, the conductive members 16A, and 40 B, C, D of copper and the insulative members 14A, 18B, C, or of polyester glass.

Figure 11:
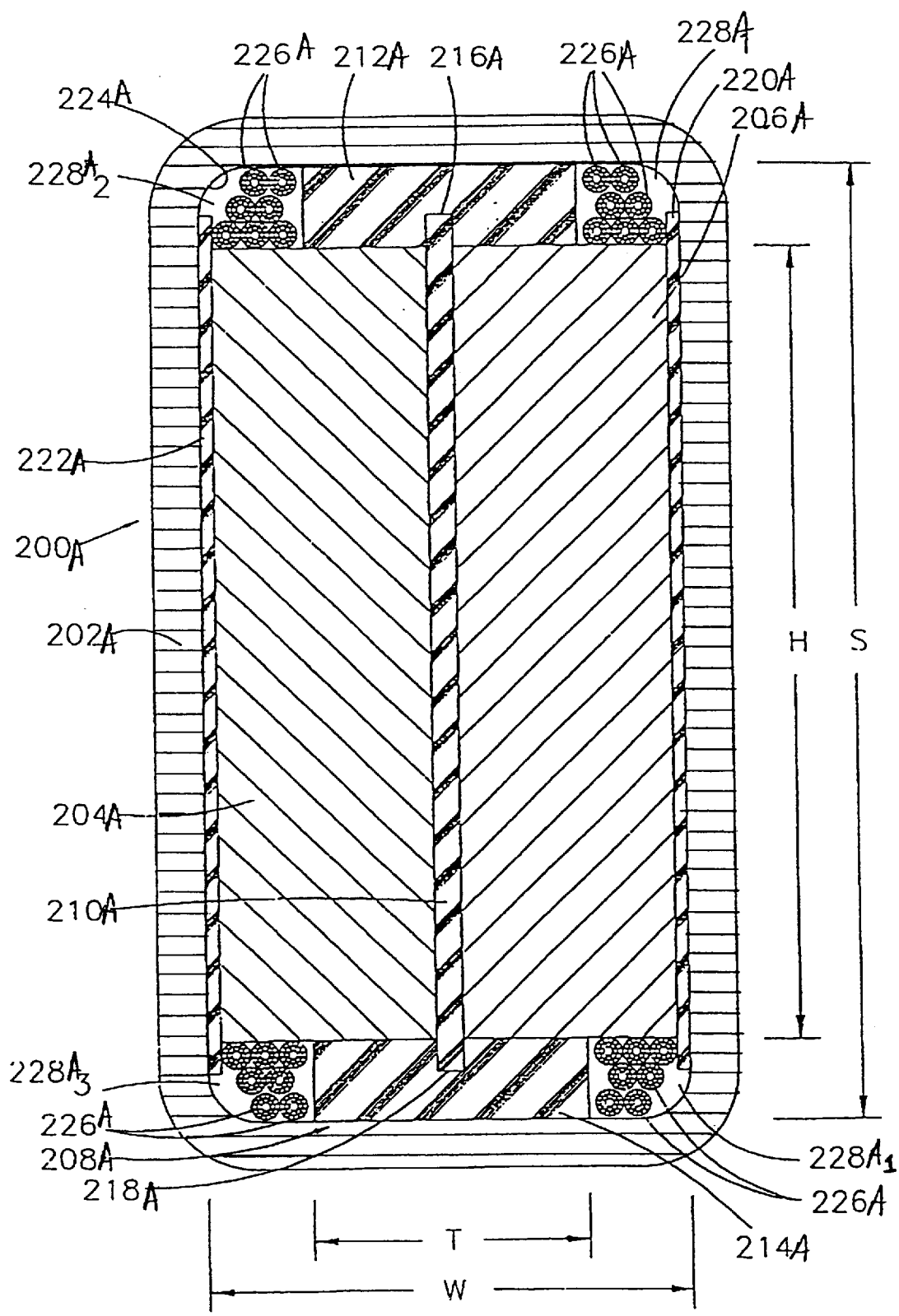
FIG. 11 is shared commonly with the parent application referenced above and is an axial cross-sectional view of an electrical bus for carrying direct current power.

Referring to FIG. 11, an embodiment of a compact electrical bus for carrying direct current power is shown in section and is designated generally 200A. Bus 200A includes an axially elongated conduit 202A and a pair of axially elongated generally rectangular positive and negative conductive members, designated 204A, 206A respectively, within conduit 202A. Bus 200A further includes insulative means for maintaining conductive members 204A, 206A spaced from conduit 202A and from one another where the insulative means is designated generally 208A in FIG. 11.

Insulative means 208A desirably includes a first axially elongated insulative planar spacer 210A which facingly contacts and separates conductive members 204A, 206A one from another. Insulative means 208A further desirably includes a pair of axially elongated insulative blocks 212A, 214A, each of which desirably has slots formed therein for receiving axially extending edges 216A, 218A of first planar spacer 210A. Slots in insulative blocks 212A, 214A have not been numbered for drawing clarity.

Insulative means 208A further desirably includes a pair of axially elongated second insulative planar spacers, respectively generally designated 220A, 222A in FIG. 11, which respectively facingly contact the inner surface 224A of conduit 202A.

Optionally, but desirably, DC bus 200A further includes at least one axially elongated fiber optic cable 226A within conduit 202A. Cable 226A resides within an axially elongated passageway resulting from the transverse length of second insulative block 214A, denoted by dimensional arrow T in FIG. 11, being less than the interior width of rectangular conduit 202A, denoted W in FIG. 11; the axially elongated passageway 228A also results from height of conductive member 206A, shown by dimension H in FIG. 11, being less than overall inner height of conduit 202A denoted by dimension S in FIG. 11. Desirably, a plurality of fiber optic cables 226A reside in axially elongated passageway 228A and even more desirably further pluralities of fiber optic cables 226A reside in additional axially elongated passageways $228A_1$, $228A_2$ and $228A_3$ resulting from dimensions T and H being respectively less than dimensions W and S as illustrated in FIG. 11.

Figure 12:
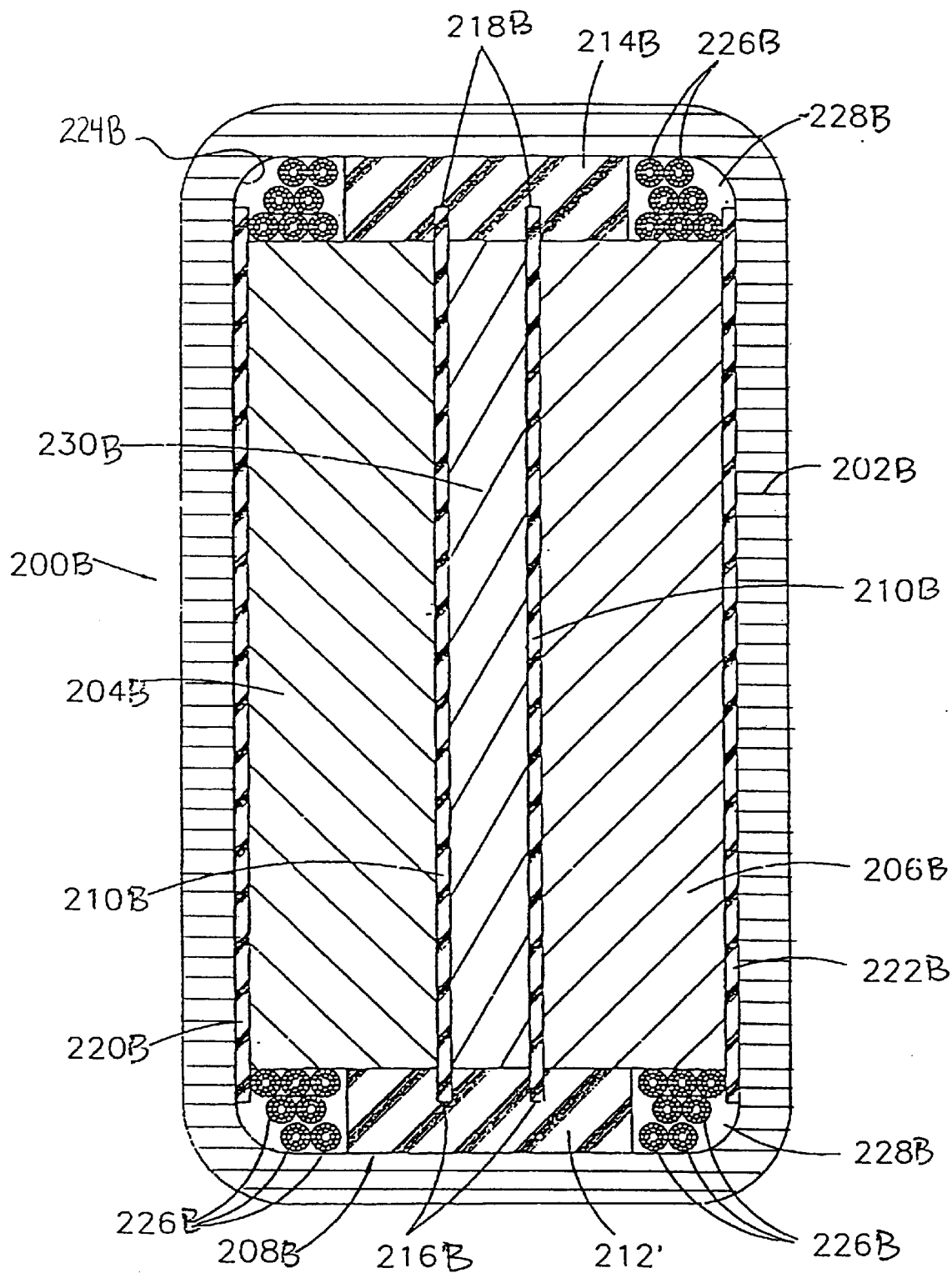
FIG. 12 is shared commonly with the parent application referenced above and is an axial cross-sectional view of a second embodiment of an electrical bus for carrying direct current power.

A second embodiment of modular direct current bus is illustrated in FIG. 12. In this embodiment, the direct current bus is designated generally 200B and includes a conduit 202B with positive and negative conductive members 204B, 206B respectively within conduit 202B.

As with the embodiment illustrated in FIG. 11, bus 200B illustrated in FIG. 12 includes insulative means 208B for maintaining conductive members 204B, 206B spaced from conduit 202B and from each other. Bus 202B further, includes a third conductive member 230B. During normal operation of bus 200B, conductive member 204B will be of positive polarity, conductive member 206B will be of negative polarity and conductive member 230B will be of neutral or grounded polarity.

Insulative means 208B of DC bus 200B further includes a pair of first planar spacers 210B respectively separating conductive member 230B from positive conductive member 204B and from negative conductive member 206B. Insulative means 208B yet further includes first and second insulative blocks 212B, 214B, each of which in turn includes longitudinally elongated slots for receiving edges 216B, 218B of first planar spacers 210B. Insulative means 208B yet further includes second insulative planar spacers 220B, 222B which respectively space and insulate positive conductive member 204B and negative conductive member 206B from interior surface 224B of conduit 202B.

Similarly to DC bus 200A, the embodiment of the DC bus illustrated in FIG. 12 as 200B desirably includes fiber optic cables 226B residing in at least one axially elongated passageway 228B. Axially elongated passageway 228B results from the transverse width of second insulative block 214B being less than the interior width of conduit 202B and from the height of negative conductive member 206B being less than the interior height of conduit 202B, similarly to the embodiment illustrated in FIG. 11.

In one of the embodiments of the device directed to the DC bus, 200A, B the conduit could be about 3½" by 6" in cross-sectional dimension. The bus could weigh about 50 pounds per linear foot and have a capacity of about 4,000 amps at about 740 volts.

Figure 13:
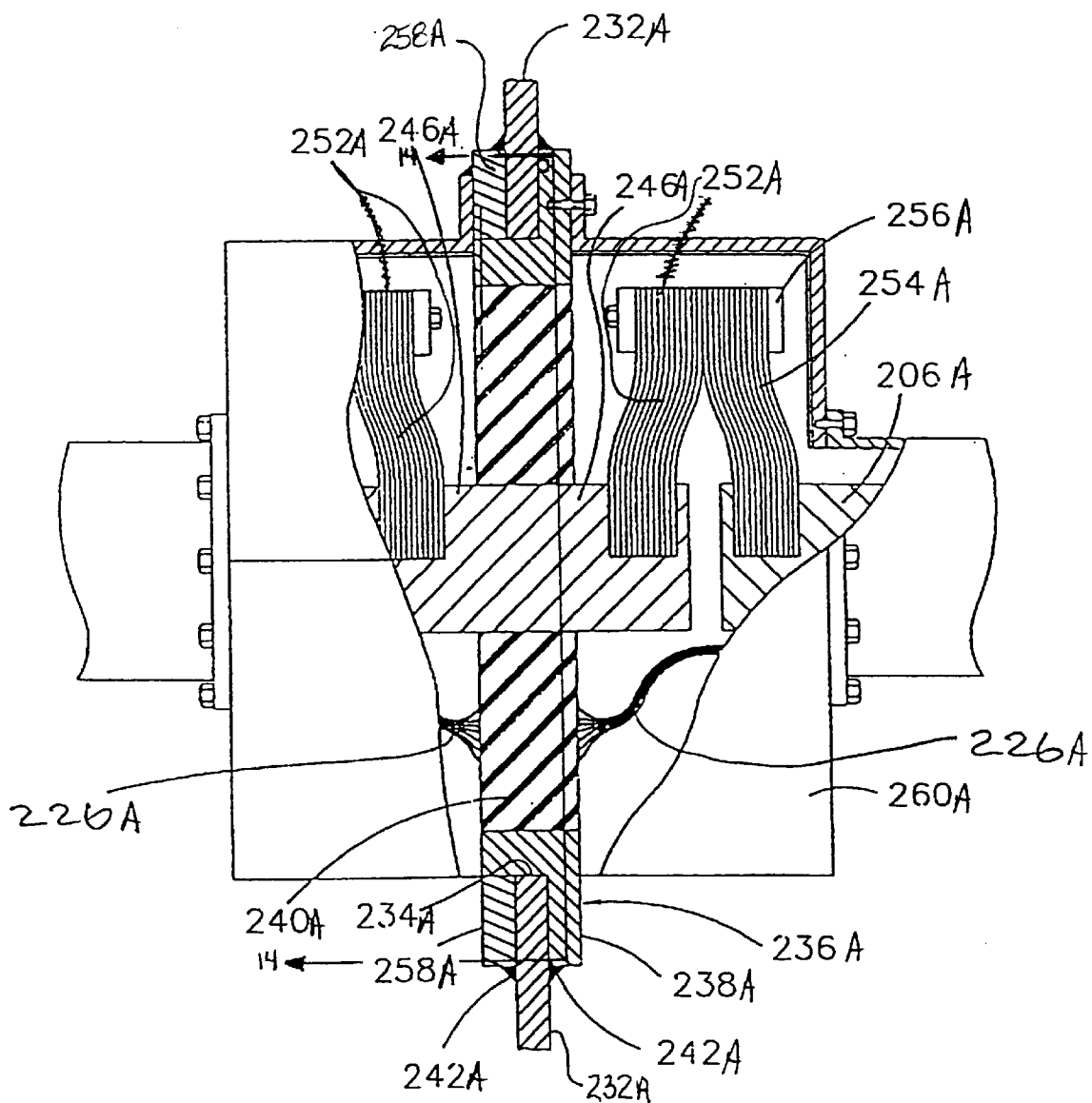
FIG. 13 is shared commonly with the parent application referenced above and is a side view, partially broken away and partially in section, illustrating structure facilitating passage through a structural wall of a direct current electrical bus which includes fiber optic transmission lines.

Structure utilized for electrical connection of two segments of a direct current electrical bus through a structural wall is illustrated in FIGS. 13 through 17. In this regard, the structure illustrated in FIG. 13 is analogous to that illustrated in FIG. 5 for the three-phase electrical bus.

Referring to FIG. 13, a structural wall or bulkhead 232A has an opening cut therethrough with the periphery of the opening designated 234A in FIG. 13.

A bonded insulative member designated generally 236A in FIG. 13 is fitted into the opening defined by periphery 234A in wall or bulkhead 232A. Bonded insulative member 236A is illustrated in greater detail in FIGS. 14, 15 and 16 and desirably includes a support ring 238A fabricated of metal, with an insulator material 240A bonded to and within ring 238A. Support ring 238A is desirably welded to wall or bulkhead 232A via welds 242A illustrated in FIG. 13.

Figure 14:
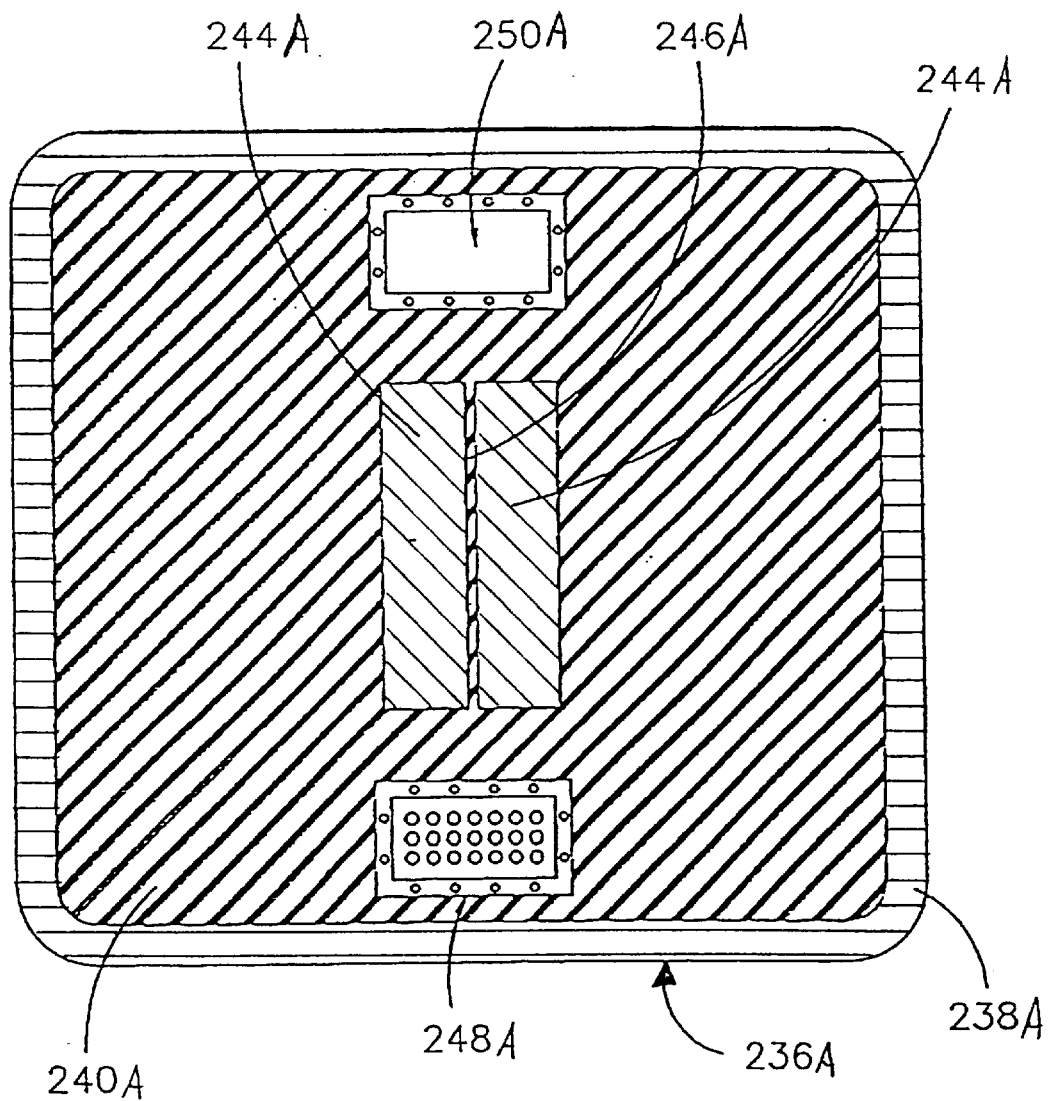
FIG. 14 is shared commonly with the parent application referenced above and is a sectional view taken at lines and arrows 14—14 in FIG. 13.

Referring generally to FIG. 14, bonded insulative member 236A further includes two or three conductive members 244A positioned generally at the center of insulative member 236A and spaced from one another by thin layers of insulator material 246A; bonded insulative member 236A includes two conductive members 244A in the embodiment illustrated in FIG. 14. (The FIG. 14 embodiment would be used for passage through a structural wall or bulkhead 232A to connect DC buses 200A of the embodiment illustrated in FIG. 11; bonded insulative member 236A would include three conductive members 244A if two DC buses 200B of the embodiment illustrated in FIG. 12 were connected.) Conductive members 244A and insulator material 240A, including the thin layer of insulator material 246A, are bonded together as the insulator material indicated as 240A and 246A is fabricated within support ring 238A. Conductive members 244A are desirably of the same size and cross-sectional shape as corresponding conductive members of the two DC buses being electrically connected and which are disposed on either side of structural wall or bulkhead 232A. The layer of insulator material 246A which separates respective conductive members is substantially the same size and cross-section as the first planar spacer or spacers separating conductive members in the respective DC buses being connected together through the structural wall. Conductive members 244A, together with the layer(s) of insulator material 246A between respective conductive members 244A, define a bus feed-through member.

Bonded insulative member 236A desirably further includes at least one fiber optic feed-through panel. One such panel has been illustrated in place in FIG. 14 and has been designated generally 248A. In the embodiment of bonded insulative member 236A illustrated in FIG. 14, provision has been made for a second fiber optics feed-through panel, which may be provided in place of blank panel 250A if desired.

Figure 17:
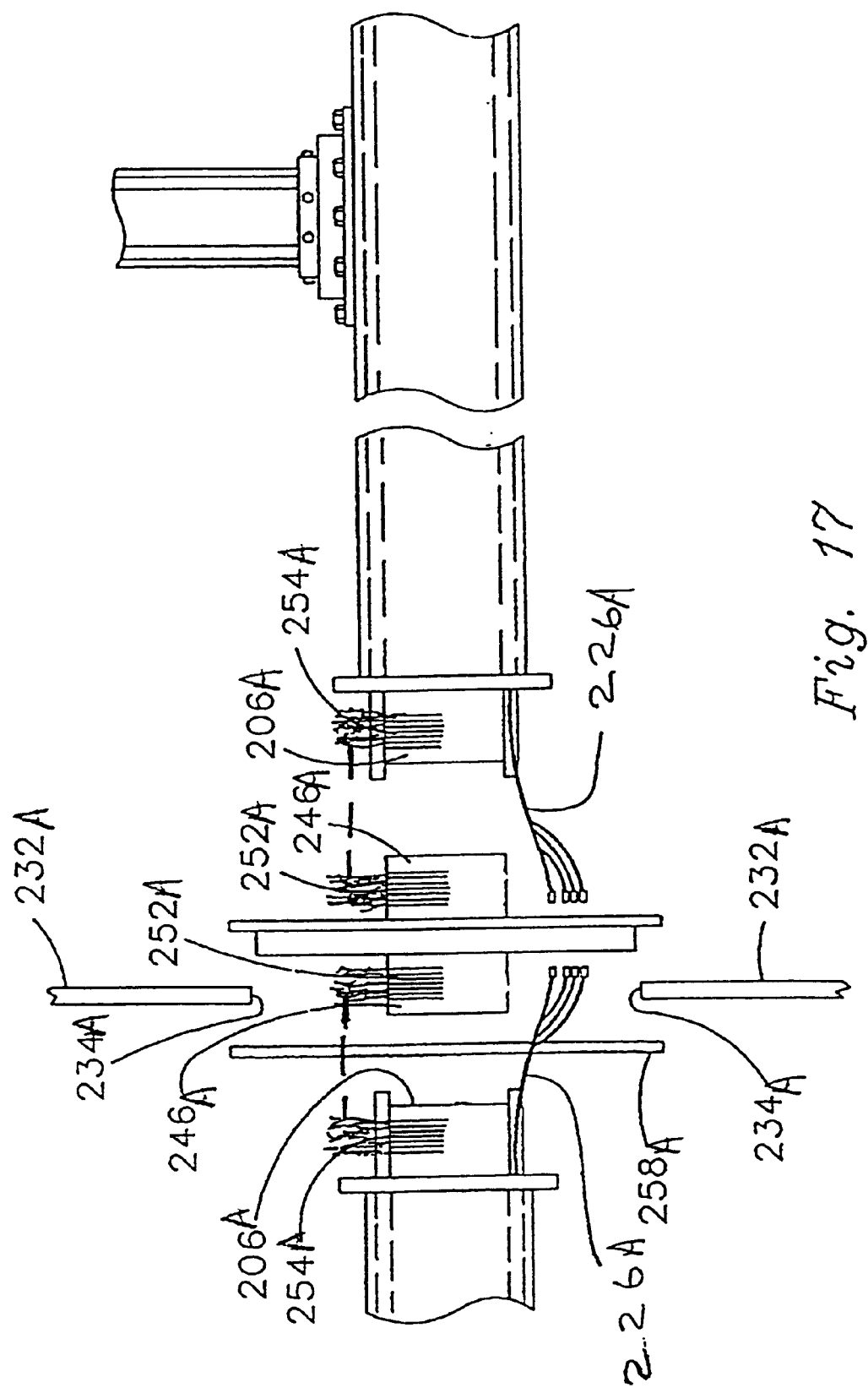
FIG. 17 is shared commonly with the parent application referenced above and is an exploded side view of structure facilitating passage through a structural wall of an electrical bus for carrying direct current, as shown generally in FIG. 13.

As shown in FIGS. 13 and 17, once bonded insulative member 236A is in place, electrical connection is effected between respective conductive members, 206A or B of bus 200A or B and conductive members 244A of bonded insulative member 236A via flexible strands 252A, 254A. Desirably, flexible strands 252A, 254A are electrically connected, most desirably by welding, to lateral extremities of conductive members 204A or B, 206A or B and 244A, with separate conductive strands being welded to each of the respective lateral extremities of conductive members 204A or B, 206A or B and 244A, as depicted in FIGS. 13 and 17. Where two DC buses of the embodiment illustrated in FIG. 12 are connected, flexible strands are welded to vertical extremities of the neutral or ground conductive member and to the corresponding conductive member 244A located centrally within bonded insulative member 236A.

Respective co-angularly positioned first and second strands 252A, 254A are connected together with a bolt connector 256A as illustrated generally in FIG. 13 and in a manner similar to that in which first and second strands 132E, 134E are connected together with bolt connector 136E as illustrated generally in FIG. 5. Bolt connector 256A has not been illustrated in FIG. 17 to aid drawing clarity.

As illustrated in FIGS. 13 and 17, further provided as a portion of the structure via which two DC buses 200A, B may be connected through a wall or bulkhead 232A is second support ring 258A. This second support ring 258A is desirably of substantially the same diameter as first support ring 238A forming a portion of bonded insulative member 236A. Second support ring 258A has sufficiently large inner diameter so that second support ring 258A does not interfere with any of the bus connection structure located within its inner periphery.

Respective pairs of flexible strands defined by strands 252A, 254A are connected by a bolt connector 256A and are angularly aligned with respect to the center line of the conduit. Most desirably, when the bus configuration illustrated in FIG. 11 is used, the respective pairs of flexible strands 252A, 254A connecting positive conductive and negative conductive members 204A, 206A are desirably angularly spaced 180 degrees apart about the center line of the conduit 202A. When the DC bus 200B of the embodiment illustrated in FIG. 12 is used, the respective pairs of strands 252A, 252B connecting respective positive, negative and neutral or ground conductive members 202B, 204B, 230B are desirably angularly spaced at least 90 degrees apart about the conduit 202B center line.

Referring to FIG. 13 a box or housing 260A may be provided about the structure connecting two DC buses 200A, 200B through a wall or bulkhead 232A; box 260A may be split substantially along a horizontal plane passing through the center of bus 200A, B.

Figure 15:
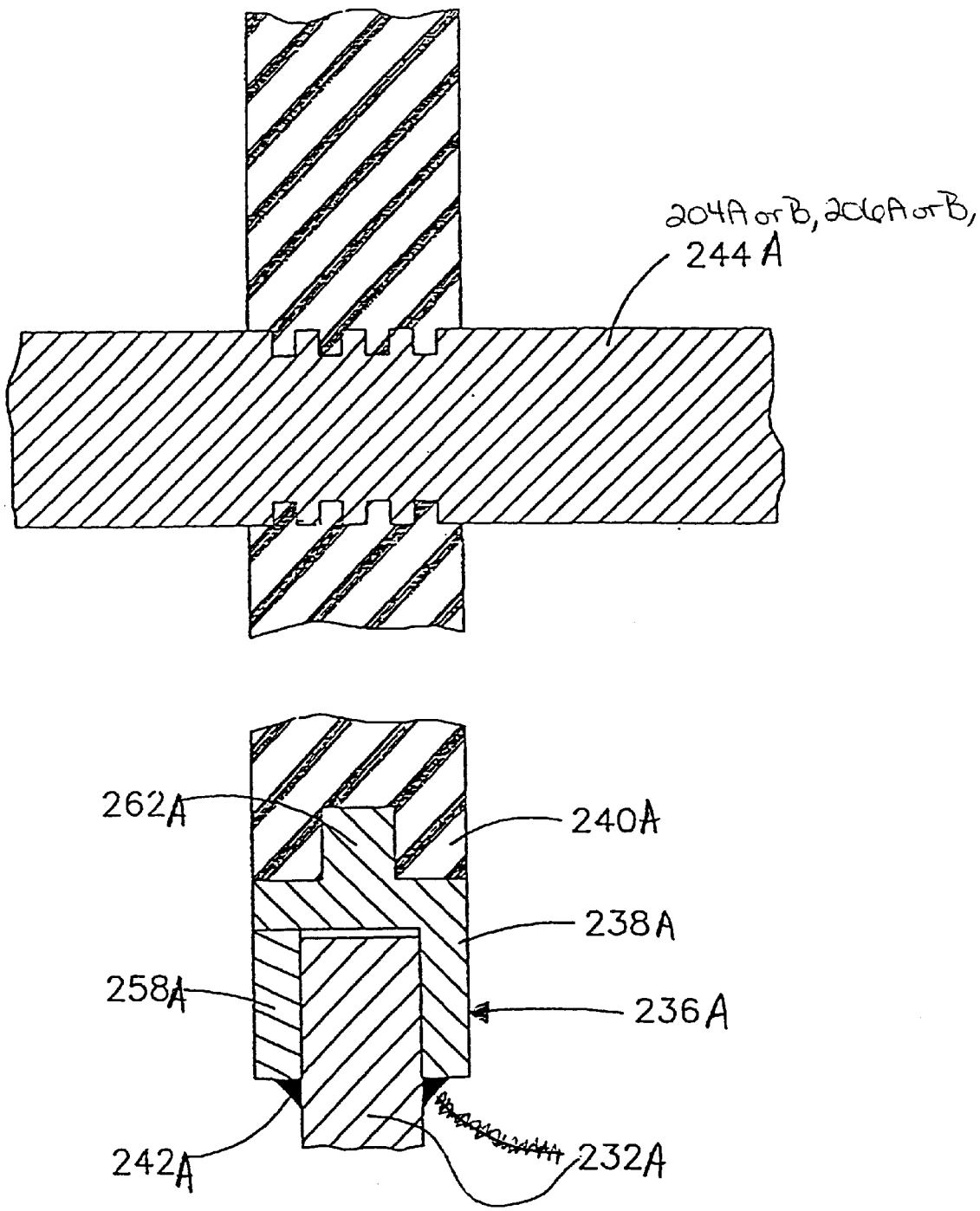
FIG. 15 is shared commonly with the parent application referenced above and is an enlarged broken detailed view, of a portion of FIG. 13, illustrating the manner in which a conductive member is retained in place by an insulative portion of structure facilitating passage of a direct current electrical bus through a bulkhead or structural wall.

The conductive members such as 204A or B, 206A or B and optional conductive member 244A all are desirably formed with notches in the central portions thereof, as generally illustrated in FIG. 15, so that when bonded insulative member 236A is fabricated by molding plastic insulator material 240A in place, the plastic insulator material 240A flows into the notches in conductive members 204A or B, 206A or B and 244A thereby securing and retaining the conductive members in position, all as illustrated in FIG. 15.

FIG. 15 also illustrates the cross-sectional configuration of second support ring 258A and the cross-sectional configuration of first support ring 238A which includes a rib 262A extending radially inwardly therefrom. Rib 262A protrudes into insulator material 240A when the plastic insulator material 240A is molded into place, thereby effecting a rigid structural connection between insulator material 240A and first support ring 238A.

Figure 16:
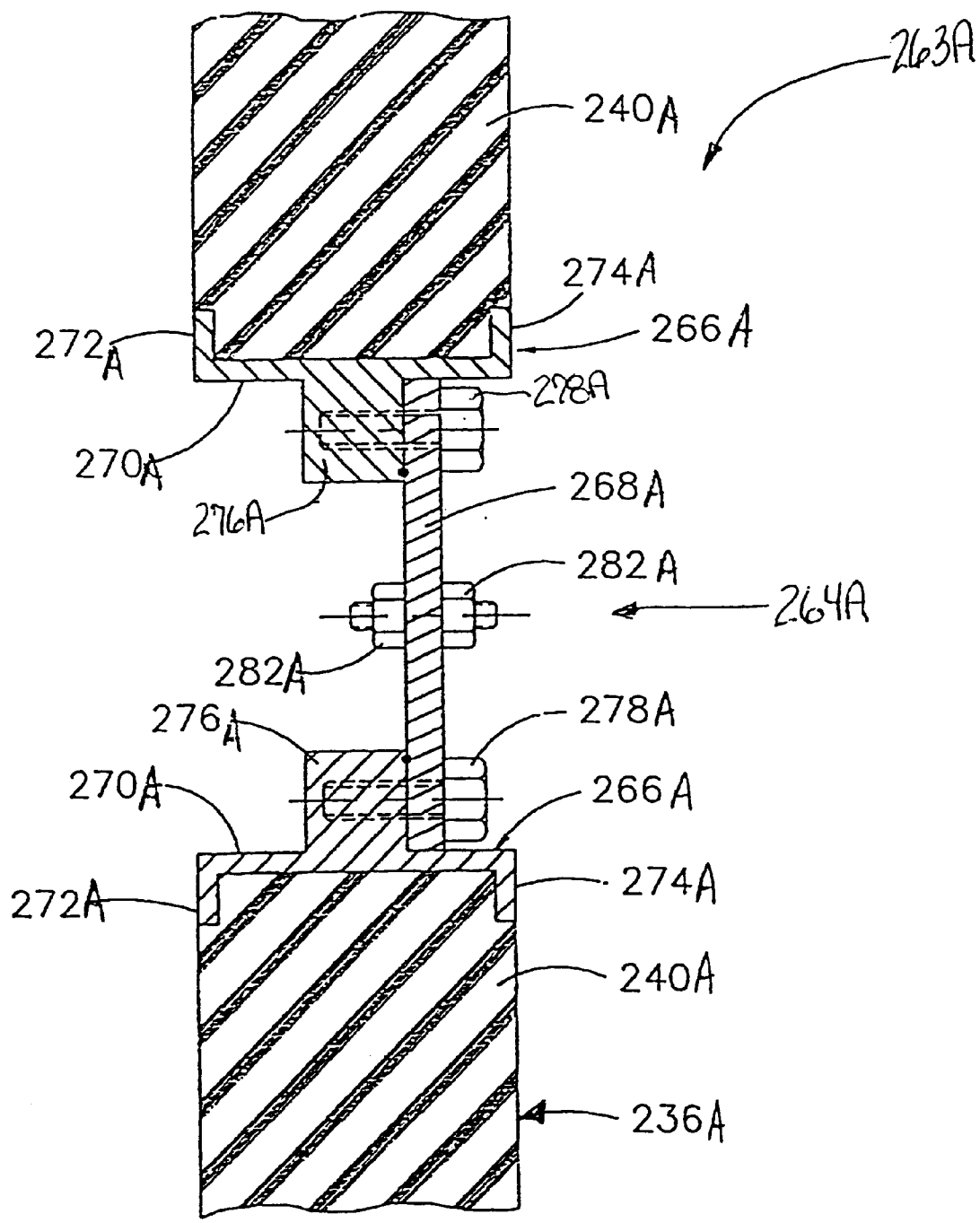
FIG. 16 is shared commonly with the parent application referenced above and is an enlarged broken sectional view of portion of FIG. 13 illustrating the manner in which a fiber optic cable passes through a structural wall along with a direct current electrical bus.

FIG. 16 illustrates an assembly, referred to generally as a fiber optics panel mounting assembly 263A, facilitating passage of fiber optic cables through the structural wall or bulkhead 232A when fiber optic cables are desirably provided as a portion of bus 200A or B. In FIG. 16, insulative material portion 240A of bonded insulative member 236A is illustrated. As further shown in FIG. 16, a fiber optics panel mounting member designated generally 264A includes first panel mounting member portion 266A and second panel mounting member portion 268A which is of generally plate-configuration.

First panel mounting member 266A is annular in form and generally includes a central or base portion 270A with flanges 272A, 274A extending radially outwardly therefrom to define, together with central portion 270A, a receptacle for insulator material 240A when fiber optics panel mounting member 264A is molded in place. (The generally annular configuration of first panel member 266A is apparent from FIG. 14 in which flange 272A is visible as being generally parallel and substantially coplanar with insulator material 240A.)

First panel mounting member 266A further includes an annular shoulder 276A extending radially inwardly generally from the center of base portion 270A.

Annular shoulder 276A provides mounting structure, specifically receptacles, for second panel mounting member portion 268A which is secured to shoulder 276A via machine screws or bolts 278A. Second panel mounting member portion 268A includes apertures therethrough in which externally threaded sleeves reside, secured by respective nuts 282A on respective sides of second panel mounting member portion 268A. In the fiber optics panel mounting member assembly 263A, second panel mounting member portion 268A fits facingly against axially facing, radially inwardly extending surfaces of shoulder 276A. Respective radially outboard edges or surface portions of second panel mounting member portion 268A additionally facingly contact the radially inwardly facing annular surface portion of first panel mounting member portion 266A. These various surfaces have not been numbered in FIG. 16 to enhance drawing clarity.

Figure 18:
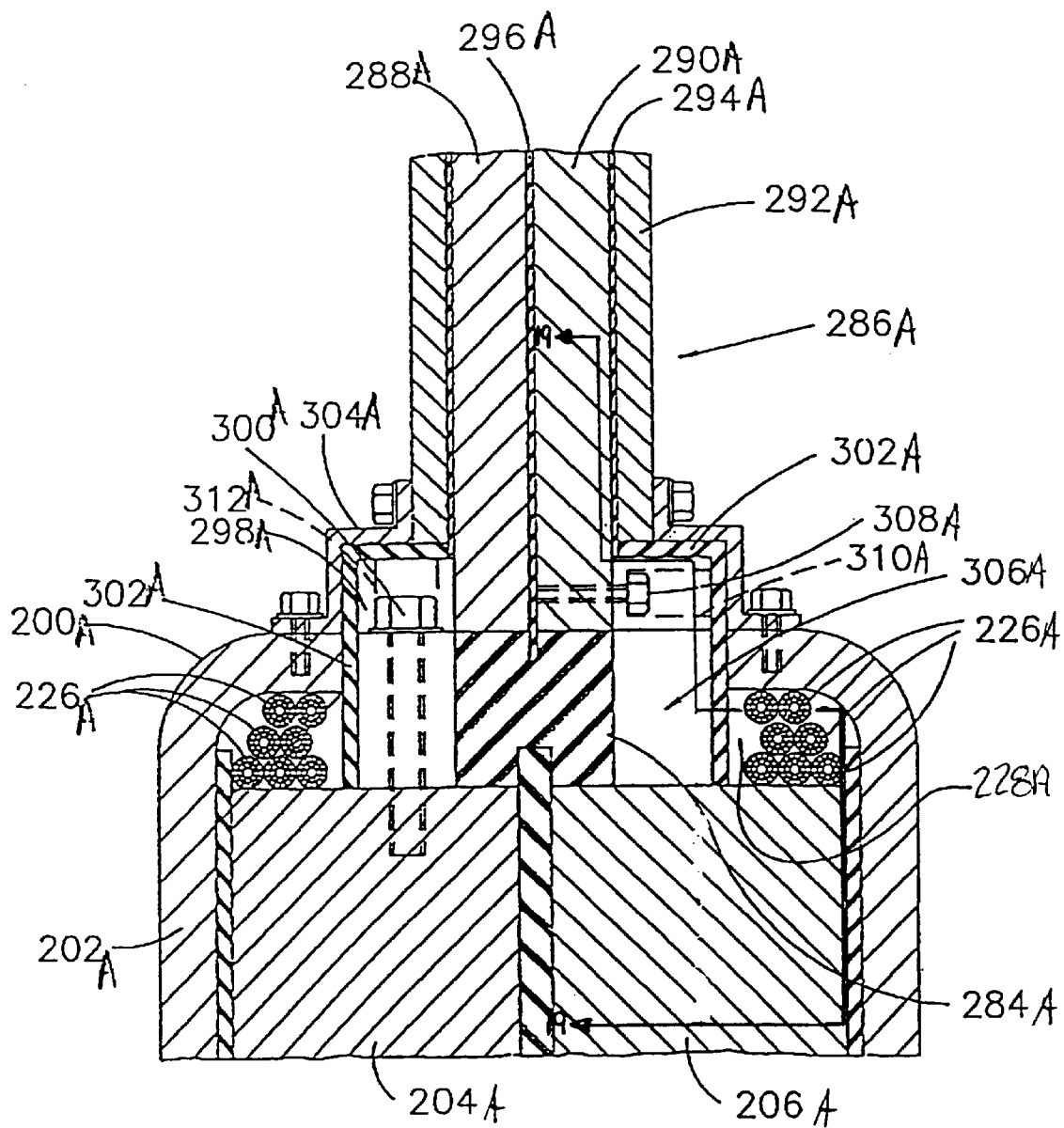
FIG. 18 is shared commonly with the parent application referenced above and is a broken vertical cross-section of the embodiment of a bus for carrying direct current as shown in FIG. 11, illustrating breakout structure for connecting the bus to a source or a user of direct current.

Structure facilitating electrical connection of the positive and negative conductive members 204A, 206A of bus 200A illustrated in FIG. 11 is depicted in FIG. 18. This breakout structure facilitating connection of conductive members 204A or B, 206A or B with either a power source or a power consumer may be provided at selected positions along bus 200A or B.

At such a breakout position, first insulative block 212A is replaced by a similar, but narrower insulative spacer block 284A. The electrical line or connector bus to which bus 200A or B is electrically connected is designated generally 286A and includes positive and negative conductive members 288A, 290A respectively. Connector bus 286A further includes an outer sleeve 292A, an insulative inner sleeve 294A and an insulative separator 296A between conductive members 288A and 290A.

Electrical connection between positive conductive member 288A of connector bus 286A and positive conductive member 204A or B of bus 200A or B is effectuated by positive breakout connector block 298A which facingly contacts both positive conductive member 288A and conductive member 204A or B. Positive breakout connector block 298A is retained in place via a machine screw 300A residing in a bore formed in conductive member 204A or B. If conductive member 204A or B is copper or some other relatively soft conductive material, an insert of harder material may be placed in the bore in order that threads formed in the insert will be strong and machine screws 300A will be securely retained in place; this enhances structural integrity of the bus assembly.

The planar surfaces of positive breakout connector block 298A which respectively contact similarly planar surfaces of conductive member 204A or B and positive conductive member 288A have not been numbered in FIG. 18, to enhance drawing clarity.

An L-shaped insulative spacer 302A fits over positive breakout connector block 298A, insulating breakout connector block 298A from conduit 202A, from outer sleeve 292A of connector bus 286A and from an external coping piece 304A which is provided to lend the requisite mechanical structural rigidity to the electrical connection of connector bus 286A and DC bus 200A. External coping piece 304A is sheet metal formed to the shape illustrated in FIGS. 18 and 19 and is desirably retained in place by suitable screws, not numbered in FIG. 18 or 19, which desirably engage insulative outer sleeve 292A and conduit 202A.

Negative conductive member 290A of connector bus 286A 288a is similarly electrically connected to negative conductive member 206A by a negative breakout connector block 306A which is in turn shielded from the ambient by an insulative spacer 302A and a coping piece 304A. Negative breakout connector block 306A is retained in place in flush, facing contact with negative conductive member 290A by a machine screw 308A received by a suitable horizontal bore in negative breakout connector block 306A and which threadedly engages negative conductive member 290A.

As with positive breakout connector block 298A, negative breakout connector block 306A has planar surfaces which respectively flushly, facingly contact corresponding planar surfaces of negative conductive member 290A and conductive member 206A or B.

Machine screw 308A resides within bore 310A formed horizontally in negative breakout connector block 306A as illustrated in FIG. 18. Similar horizontal bores are formed in positive breakout connector block 298A. The vertical bore 312A formed in positive breakout connector block 298A is formed at a longitudinal position in positive breakout connector block 298A somewhat removed from the longitudinal position at which a horizontal bore corresponding to bore 310A is formed. Similarly, negative breakout connector block 306A includes at least one vertical bore corresponding generally to bore 312A where such a vertical bore is longitudinally displaced from horizontal bore 310A to ensure the structural strength and rigidity of negative connector block 306A.

Figure 19:
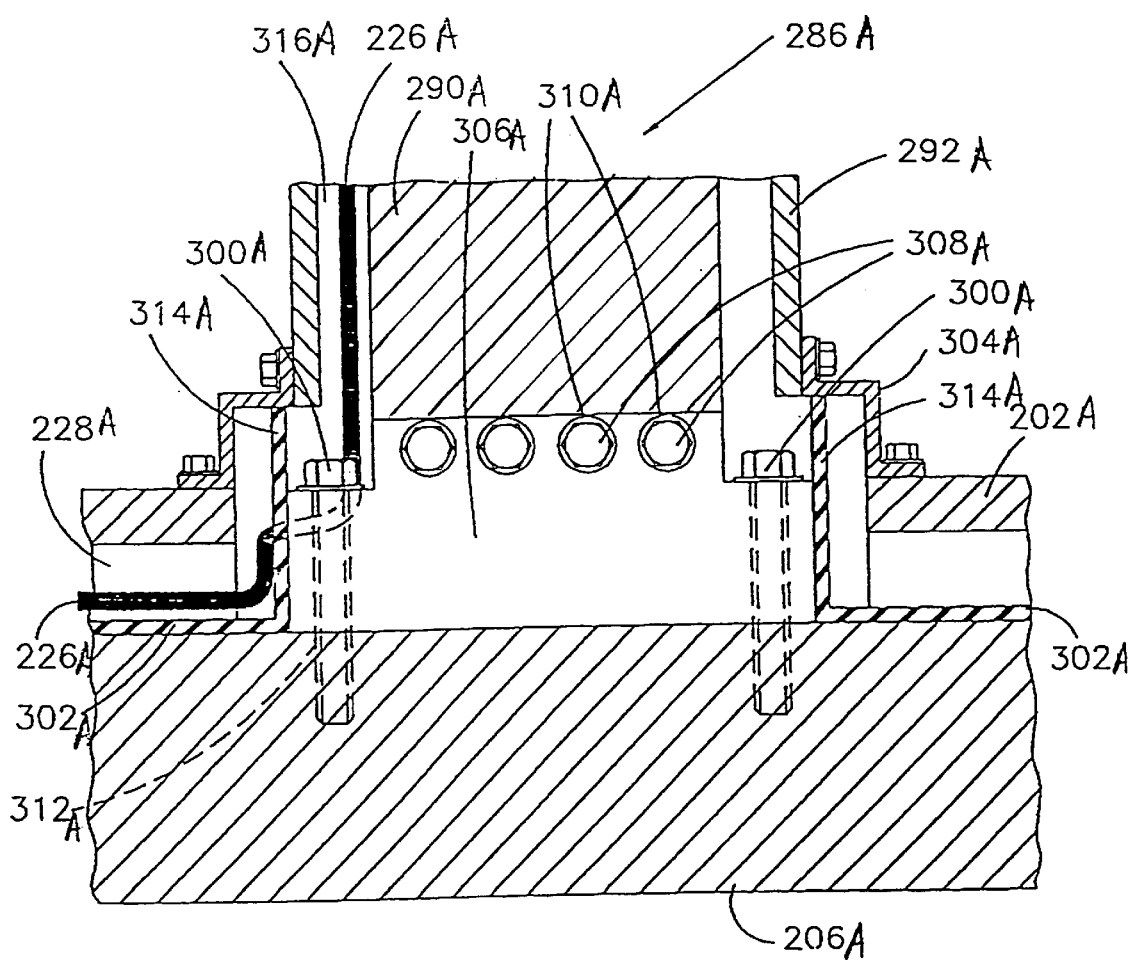
FIG. 19 is shared commonly with the parent application referenced above and is an enlarged broken sectional view taken at lines and arrows 19—19 in FIG. 18.

In FIG. 19, the construction of negative breakout conductor block 306A and its position respecting negative conductive member 290A, conductive member 206A or B and fiber optics cable 226A is illustrated. (In FIG. 19, the longitudinal direction is the horizontal direction shown in the drawing figure, whereas in FIG. 18, the longitudinal direction is the direction perpendicular to the plane of the paper.) In FIG. 19, the longitudinal spacing of machine screws 300A from machine screws 308A, resulting from the longitudinal spacing of vertical bores 312A from horizontal bores 310A formed in negative breakout connector block 306A is clear.

Further apparent from FIG. 19 is the configuration of insulative spacer 302A which separates one or more fiber optics cables 226A (only one of which is illustrated in FIG. 19) from negative conductive member 206A or B of bus 200A or B. Insulative spacer 302A provides vertical support for coping piece 304A; this vertical support is also apparent from FIG. 18. A suitable gap in a vertically upstanding wall portion 314A facilitates feedthrough of fiber optics cable 226A and further facilitates communication between axially elongated passageway 228A of bus 200A or B and a similar vertically extending passageway 316A of connector bus 286A.

Figure 20:
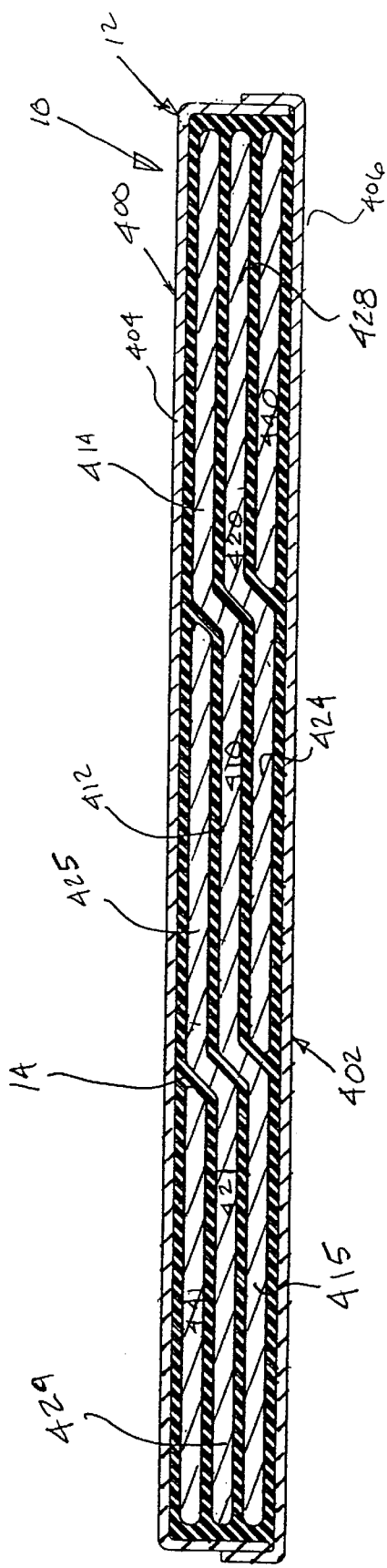
FIG. 20 is a transverse cross-sectional view of the preferred embodiment of a bus for transmitting three-phase electrical power manifesting aspects of the invention.

Referring to FIG. 20 there is illustrated a preferred embodiment of a bus for transmitting three-phase electrical power, manifesting aspects of the invention. The preferred embodiment of the three-phase power transmission bus is designated generally 10 and includes a conduit 12 filled with insulator material designated generally 14 and conductive means not generally designated in FIG. 20, but are described in detail below.

Conduit 12 includes two sections, an upper element 400 and a lower element 402, which fit together as illustrated, with upper element 400 fitting generally within lower element 402 in a press fit assembly. Upper element 400 has a generally planar top 404 and two sides extending transverse the planar top. Lower element 402 has a generally planar bottom 406 and two generally planar sides extending transverse the planar bottom.

The directions in the following discussion are taken with respect to FIG. 20. The vertical direction is referred to as vertical, the horizontal direction is referred to as lateral, and the direction perpendicular to the paper is referred to as longitudinal.

The conductive means includes a plurality of electrically conductive longitudinally elongated elements disposed within conduit 12. Preferably, the conductive means includes a double-offset central element 410, two single-step elements 420, 421 and two straight elements, 440, 441.

As illustrated in FIG. 20, central element 410 has a two-step shaped cross-section. Central element 410 has a middle portion 412 and two offset extremities 414, 415. Preferably middle portion 412 and extremities 414, 415 extend laterally, parallel to one another and are substantially the same length and thickness. Extremities 414, 415 are offset vertically in opposite directions and are connected to middle portion 412 by angled sections.

As illustrated in FIG. 20, both single-step elements 420, 421 have a single-step shaped cross-section. The step shaped cross-section is configured so that single-step elements 420, 421 correspond to central element 410 in a nesting relationship. In this relationship, single-step elements 420, 421 are located on opposing sides of central element 410. Each single-step element 420, 421 comprises an intermediate portion 424, 425 and an offset portion 428, 429 joined by an angled portion.

To properly nest with central element 410, intermediate portions 424, 425 of respective single-step elements 420, 421 are parallel to and substantially the same length and thickness as middle portion 412. Additionally, offset portions 428, 429 are parallel to and substantially the same length and thickness as corresponding offset extremities 414, 415 of central element 410.

The third conductive elements are straight elements 440, 441. Straight elements 440, 441 correspond to single-step elements 420, 421 in a nesting relationship, in which straight element 440 is adjacent to and in nesting relation with single-step element 420 and straight element 441 is adjacent to and in nesting relation with single-step element 421. Preferably, straight elements 440, 441 are parallel to and substantially the same length and thickness as respective offset extremities 414, 415.

With the above nesting configuration, each of the conductive elements is a separate lamina, which is stacked within conduit 12 as follows. Within the conduit, 12 straight element 440 is located adjacent the right side of conduit 12 and adjacent planar bottom 406 of lower conduit element 402. Single-step element 420 overlaps straight element 440, so that offset portion 428 is adjacent the right side of conduit 12 and vertically separated by insulation from straight element 440 and intermediate portion 424 is adjacent planar bottom 406 and laterally separated by insulation from straight element 440.

Double-offset central element 410 overlaps single-step element 420, so that offset extremity 414 is adjacent the right side of conduit 12 and planar top 404 and is vertically separated by insulation from offset portion 428. In this relation, middle portion 412 is vertically separated from intermediate portion 424 of single-step element 420 and is laterally separated by insulation from offset portion 428. Offset extremity 415 is adjacent the left side of conduit 12 and planar bottom 406.

Single-step element 421 overlaps offset extremity 415 and middle portion 412 of central element 410. In this way, offset portion 429 is adjacent the left side of conduit 12 and vertically separated by insulation from offset extremity 415. Intermediate portion 425 is adjacent planar top 404 and vertically separated by insulation from middle portion 412.

Straight element 441 overlaps offset portion 429 of single-step element 421. In this way, straight element 441 is adjacent the left side of conduit 12 and planar top 404, and vertically separated by insulation from offset portion 429.

Preferably the insulation separating each portion of the lamina that are vertically overlapping is less than the thickness of each respective lamina portion. For example, offset portion 429 of single-step element 421 overlaps offset extremity 415 of central element 410. Preferably the insulation separating offset portion 429 from offset extremity 415 is less than the thickness of either offset portion 429 or offset extremity 415.

Preferably the three phase power is connected to the conductive means so that each phase passes through an element or combination of elements having equal cross-sectional area. Preferably, the three phases are connected as follows: one phase is connected to central element 410; the second phase is connected to single-step element 420 and straight element 441; and the third phase is connected to single-step element 421 and straight element 440. When connected in this manner, each side of conduit 12 is adjacent a conductor for each phase of power.

Figure 21:
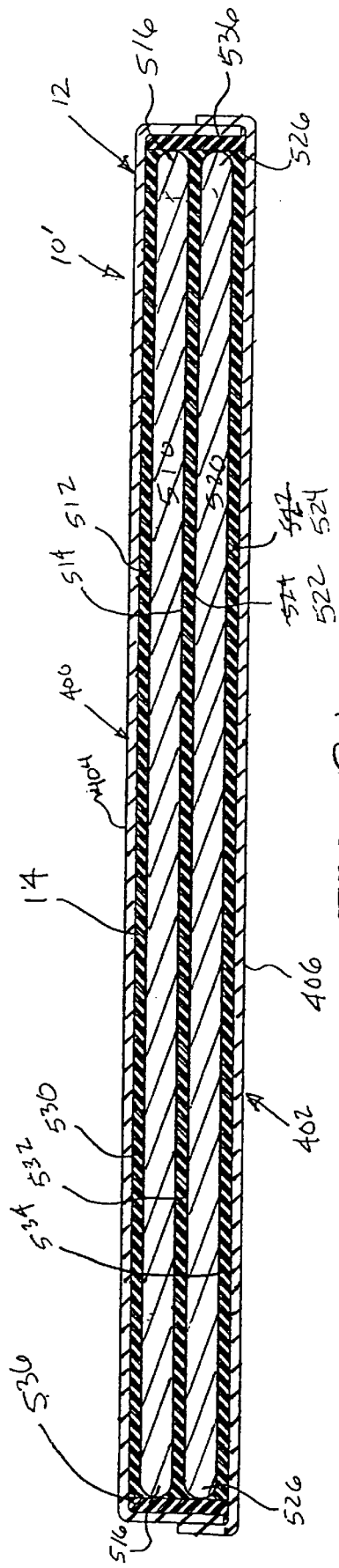
FIG. 21 is a transverse cross-sectional view of the preferred embodiment of a bus for transmitting DC electrical power manifesting aspects of the invention.

FIG. 21 illustrates another embodiment of the modular bus, which is used for transmitting direct current power. The conduit 12 is configured in the same manner as the conduit used in the three-phase power transmission bus described above. The preferred embodiment of the DC power transmission bus is designated generally 10' and includes a conduit 12 filled with insulator material designated generally 14 and conductive means comprising positive conducting element 510 and negative conducting element 520.

Positive element 510 and negative element 520 are longitudinally elongated within conduit 12. Both elements are also laterally elongated, and are preferably the same lateral width. Each element has generally parallel upper and lower surfaces, positive element 510 having upper surface 512 and lower surface 514, negative element having upper surface 522 and lower surface 524. Preferably, the positive and negative elements have curved sides 516 and 526 respectively.

Insulation 14 is provided around the positive and negative elements, spacing them from each other and from conduit 12. Insulation 14 comprises five portions: three laterally elongated blocks, namely upper block 530, intermediate block 532, lower block 534, and two vertically elongated side blocks 536. Each block is longitudinally elongated within conduit 12.

Upper block 532 separates positive element 510 from planar top 404 of conduit 12 by facingly contacting planar top 404 and upper surface 512 of positive element 510. Intermediate block 532 separates positive element 510 from negative element 520 by facingly contacting lower surface 514 of positive element 510 and upper surface 522 of negative element 520. Lower block 534 separates negative element 520 from planar bottom 406 of conduit 12 by facingly contacting lower surface 524 of negative element 520 and planar bottom 406 of conduit. Side blocks 536 extend transverse to positive and negative elements 510 and 520, separating the elements from the sides of conduit 12, by contacting both elements and the three laterally elongated insulative blocks, and facingly contacting planar top 404 and planar bottom 406, each of side blocks 536 facingly contacting a different side of conduit 12, ie. a right side or a left side.

Figure 22:
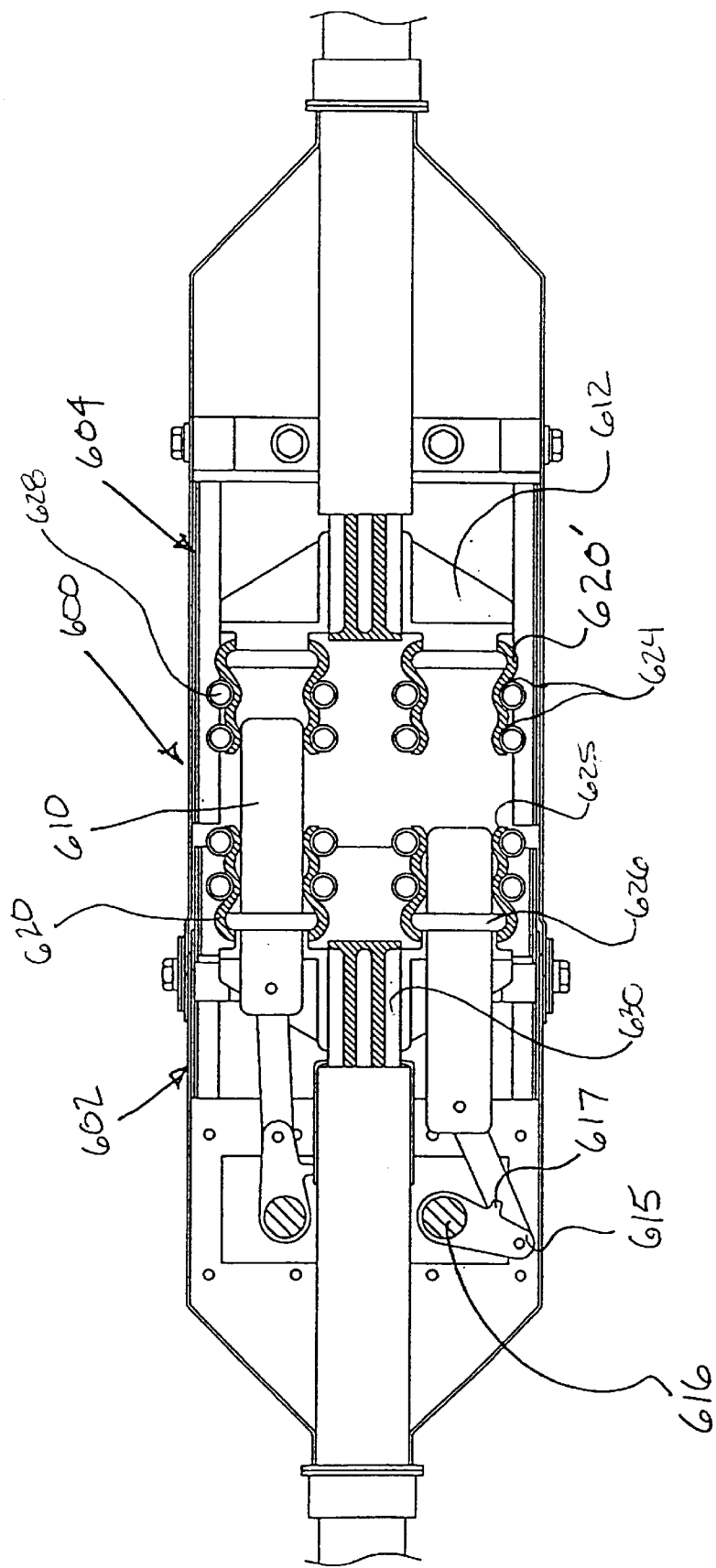
FIG. 22 is a partially sectioned side view of a preferred embodiment of apparatus for connecting respective sections of a bus for transmitting three-phase electrical power manifesting aspects of the invention, showing portions of the connecting means extended in connecting disposition and other portions of the connecting means retracted from the connection position.
Figure 23:
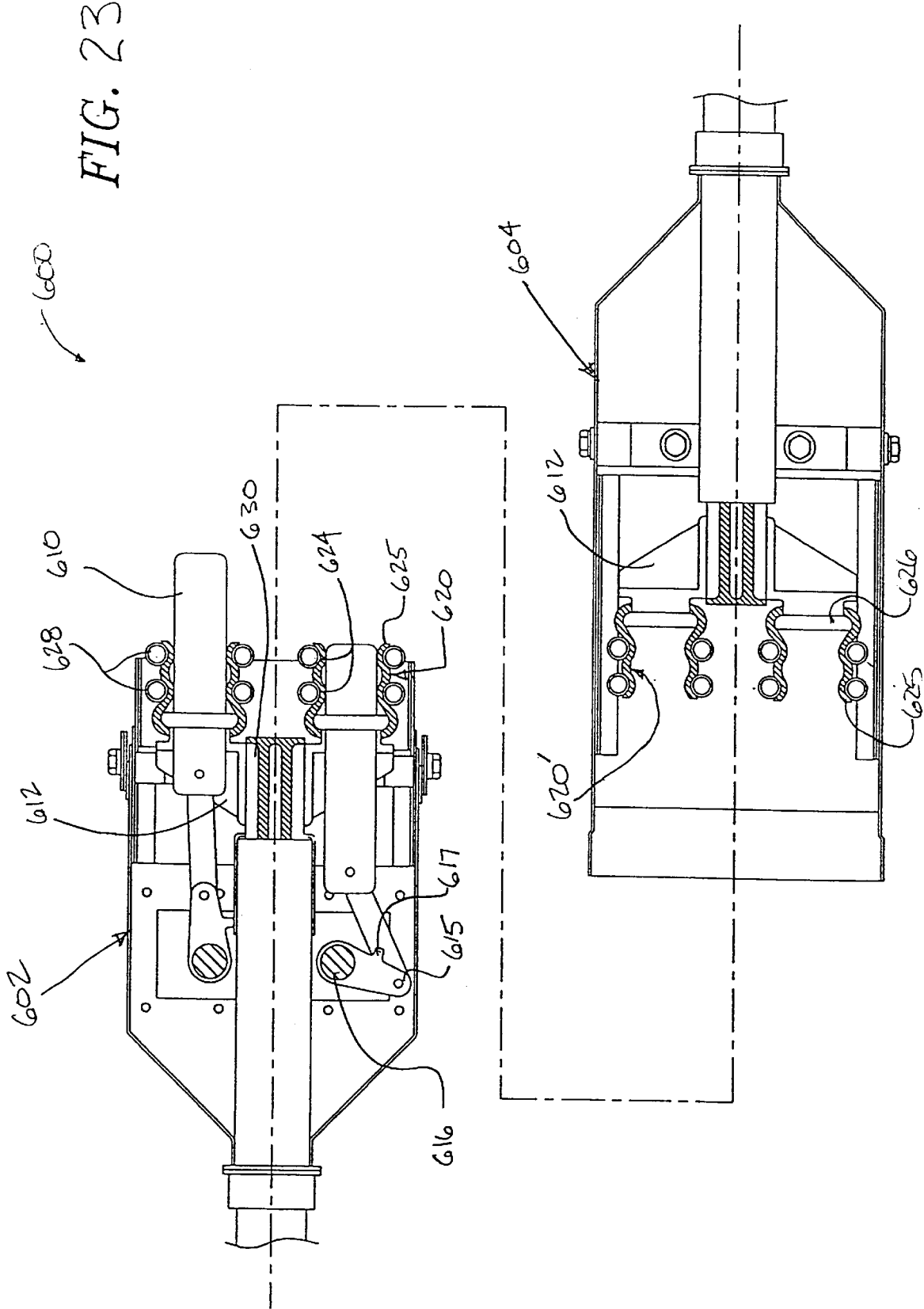
FIG. 23 is a partially sectioned side view of a preferred embodiment of apparatus for connecting respective sections of a bus for transmitting three-phase electrical power manifesting aspects of the invention, similar to FIG. 22, showing respective male and female parts of apparatus for connecting respective sections of the bus for transmitting three-phase electrical power.

Referring now to FIGS. 22–26, a bus connector is designated generally 600. Bus connector 600 is used to connect sections of three-phase power transmission bus 10 described above, thereby allowing bus 10 to be extended in sections. The bus connector has a male connector 602 and a female connector 604 that connect with respective male and female connectors on adjoining sections of bus 10 as shown in FIGS. 22 and 23.

FIG. 23 illustrates a cross-sectional view of bus connector 600, showing the male connector 602 at the end of one section and the female connector 604 at the end of an adjoining section. Male connector 602 comprises a series of pins 610 than can be extended or retracted through a series of receptacles 620 via a series of levers 615. Female connector 604 comprises the same receptacles 620, but do not have pins 610 or levers 615. To distinguish the receptacles 620, in the following description female receptacles are designated as 620'.

In FIG. 22 the upper pin 610 is shown in the extended position, engaging a corresponding female connector 604 in an adjoining connector. The lower pin 610 is shown in the retracted position in which there is no contact between the pin and the adjoining connector.

Figure 24:
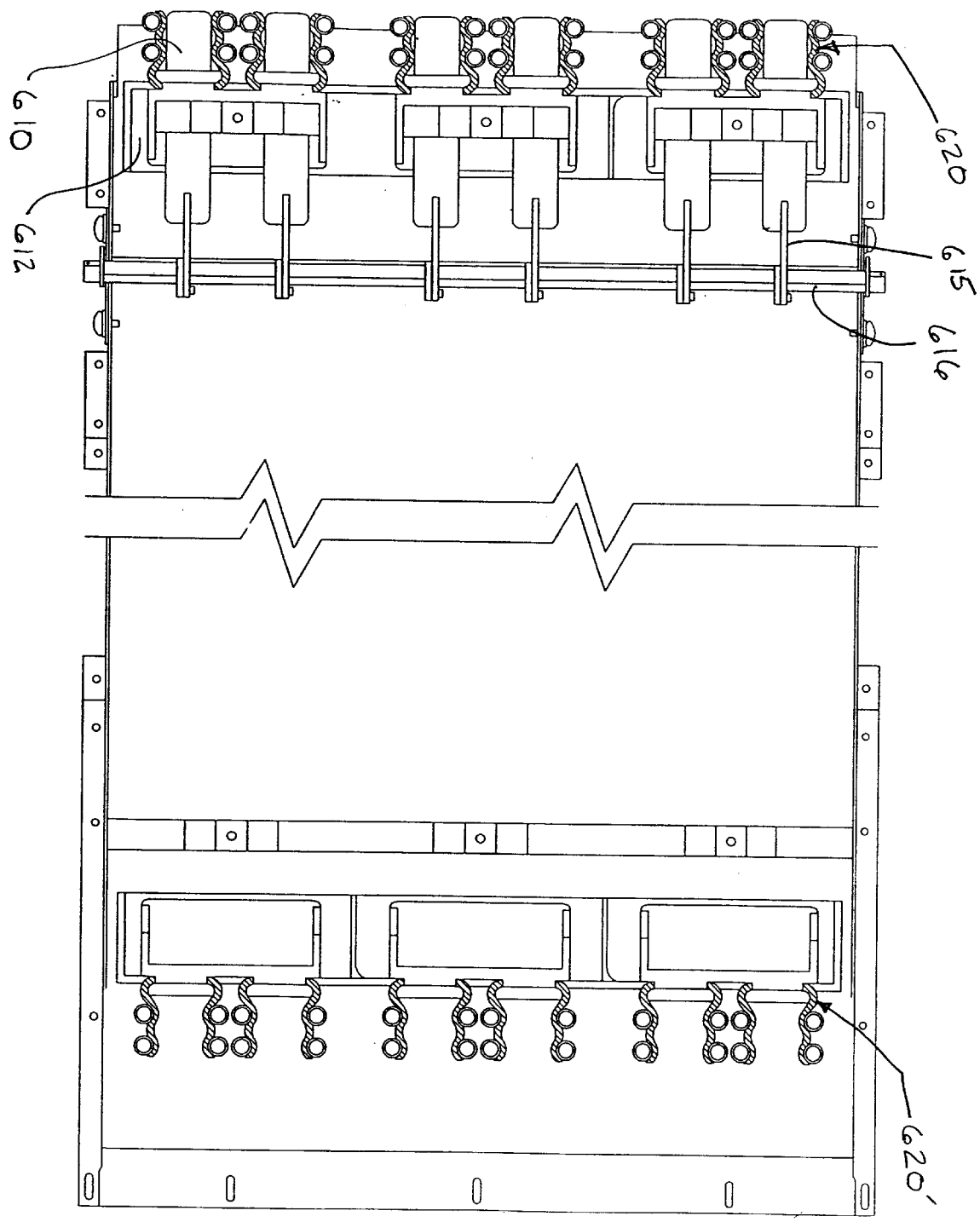
FIG. 24 is a top view of the apparatus of FIG. 23 taken as if the upper portions of the housings for the connecting apparatus of FIG. 23 had been removed.
Figure 25:
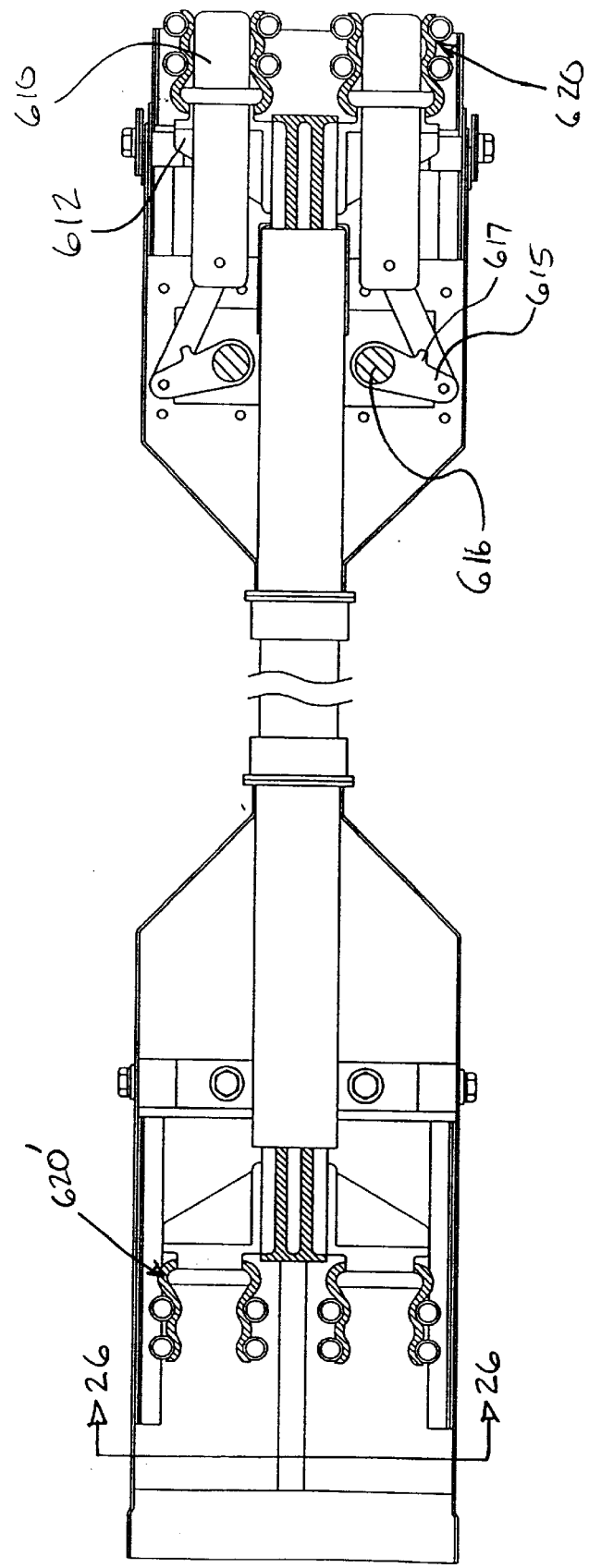
FIG. 25 is a broken view illustrating the manner in which the housing and the connecting apparatus are connected by a bus for transmitting electrical power.
Figure 26:
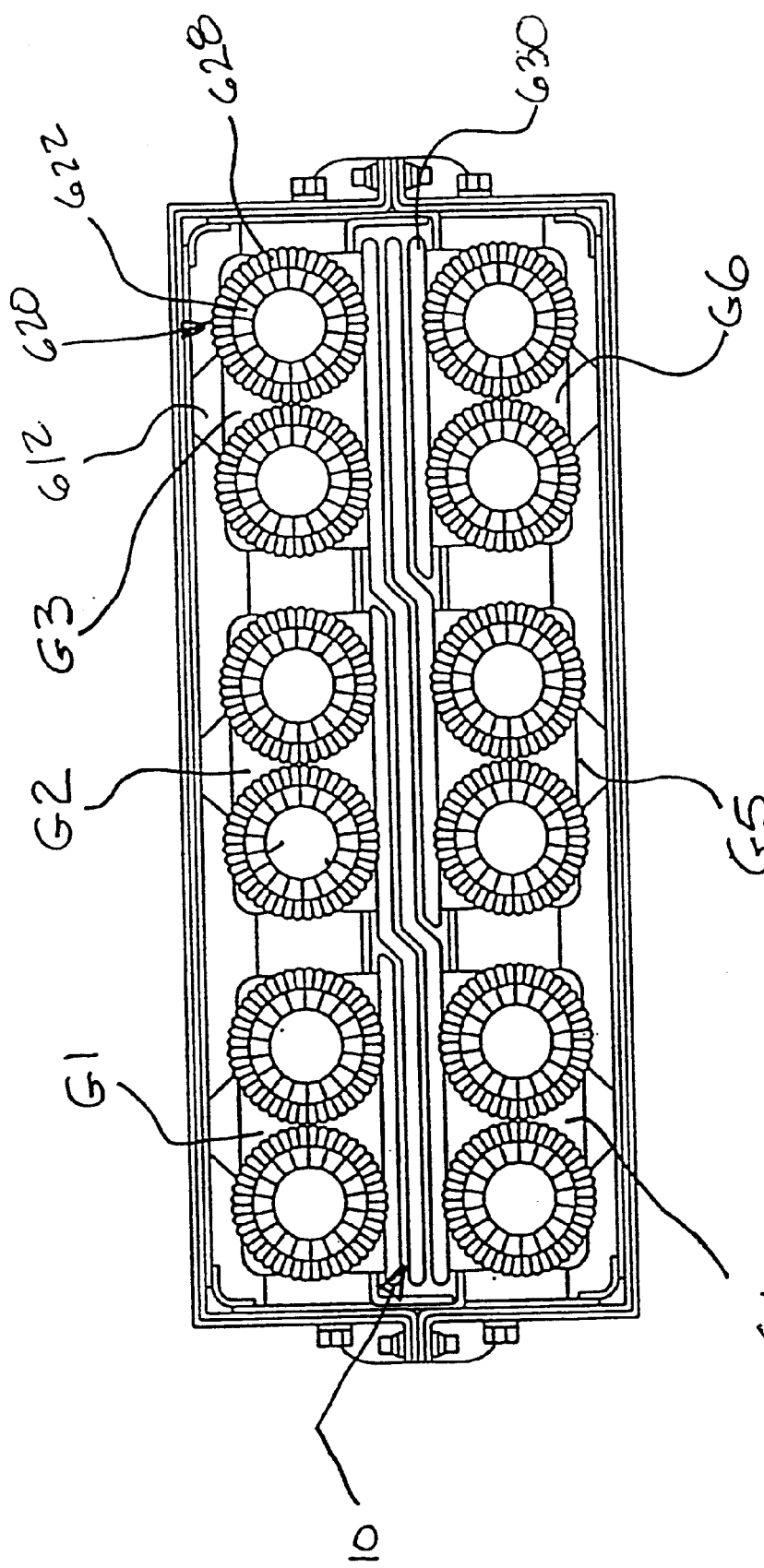
FIG. 26 is an end view of a female section of the preferred embodiment of apparatus for connecting respective sections of a bus for transmitting three phase electrical power looking from the left hand side of FIG. 25 as indicated by arrows 26—26 in FIG. 25.

Lever 615 operates as a slider-crank mechanism, being rotated by a shaft 616. The rotation of shaft 616 in one direction causes lever 615 to extend pin 610 through receptacle 620. The opposite rotation causes lever 610 to retract pin 615. A lever stop 617 is provided to prevent lever 615 from rotating beyond the fully extended position. As illustrated in FIG. 26, the male connector comprises two vertically separated horizontal rows of individual connectors. As shown in FIG. 24, the levers 615 for each horizontal row are all connected to a single shaft 616 so that each horizontal row of levers rotates simultaneously.

The conductive elements of bus 10 are designated generally 630 in FIG. 23. A bracket 612 provides an electrical connection between each element 630 and a corresponding receptacle 620. Preferably, each bracket 612 is connected to one element 630 and two receptacles 620. The receptacles 620 are configured so as to contact pins 610. When pin 610 extends into a receptacle 620 in an adjoining female connector 604, an electrical connection is made between the pin and the receptacle 620 of the female connector 604. In this way, an electrical connection is made between adjoining section of three-phase power transmission bus 10.

As mentioned above, pin 610 slides within receptacle 620. Preferably receptacle 620 is a generally bulbous-shaped longitudinally elongated shell, so that the base of the receptacle has a larger interior area than the area near the top. An opening through the top and the base of receptacle 620 allows pin 610 to slide through the receptacle 620. Preferably the base flares out to provide an interior area large enough for a sleeve 626 having an annular lip. Sleeve 626 resides within receptacle 620 to guide pin 610. Beyond sleeve 626, toward the top, receptacle 620 tapers inward providing an interior area smaller than the sleeve so that the sleeve is engaged within the receptacle. Receptacle 620 also flares outwardly at the top opening, creating a lip 625.

Preferably, receptacle 620 has at least one and preferably two outwardly facing convex annular recesses 624. Recesses 624 are transverse the longitudinal axis of receptacle 620 and are large enough to receive a resilient means such as a coil spring 628. Coil springs 628 urge receptacle 620 inwardly to ensure contact between the receptacle 620 and pin 610.

Receptacle 620 is preferably not a unitary piece. Instead, receptacle 620 comprises a series of longitudinally elongated leaves circularly arranged about a longitudinal axis. This configuration is illustrated in FIG. 26 which shows the end view of the series of leaves.

Referring further to FIG. 26, the arrangement of the individual receptacles 620 can be seen with reference to the cross-section of the conductive elements 630 of three-phase power transmission bus 10. As described previously, three-phases of electricity flow through bus 10. In the present instance, twelve receptacles 620 are arranged on six brackets 612, to form six groups of two receptacles each.

Three groups designated G1, G2, G3 form an upper horizontal row of six receptacles, and three groups G4, G5, G6 form a lower horizontal row of six receptacles. Groups G1 and G5 conduct one phase of electricity. Groups G2 and G6 conduct a second phase of electricity; and groups G3 and G4 conduct the third phase of electricity.

Referring now to FIGS. 22 and 23, adjoining sections of three-phase power transmission bus 10 are connected as follows. The outer casing of male connector 602 is brought into contact with a flange on the outer casing of female connector 604 so that the flange overlaps the outer casing of male connector 602. The casings of the two connectors are then coupled by such means as bolting or welding.

Once the casings of the adjoining connectors are coupled, the shafts 616 for the upper and lower rows of levers 615 are rotated. Rotating shafts 616 cause levers 615 to extend pins 610 out of receptacles 620 to engage corresponding adjoining receptacles 620' in female connector 604.

Preferably, the conductive elements of the invention are fabricated of copper. However, aluminum or even silver may also be used as may other conductive materials.

A major advantage provided by the invention in all of its embodiments is that all components of the particular current being carried are in one compact package as opposed to use of conventional individual cables. Conventional cables must be provided with stuffing tubes where they pass through a wall or bulkhead. In the instant invention, the bus is actually fabricated effectively as a piece of or built into the wall or bulkhead. The bus is preferably welded in place after being checked for structural integrity and, in nautical applications, for water-tight integrity.

In the embodiments of the invention, the candidate materials for constructing the conduit are materials such as steel, aluminum, plastic or carbon fiber composites. Steel may be preferred in nautical applications, to protect the bus from shrapnel. The insulative members separating the conductive elements may be epoxy, polyester, teflon, nylon or even ceramic. In this regard, inorganic materials are preferable to avoid any charring in the event of dielectric effects. Inorganic materials do not produce smoke since there is no charring.

Respecting the facingly contacting surfaces of the respective conductive and insulative members, there is no need for bonding at such surfaces for purposes of achieving mechanical strength characteristics; however, there may bonding provided at such surfaces for thermal conductance at such interfaces.

While the preferred embodiment of the invention has been described above and alternative embodiments have also been described, the scope of protection to which the invention is believed entitled is defined by the claims and by equivalents thereto which perform substantially the same function in substantially the same way to achieve substantially the same result as the subject matter defined literally by the claims, so long as such substantial equivalents, as defined by a claim for such substantial equivalent, do not read on the prior art.

What is claimed is:

1. A three-phase electrical power bus comprising:
   a. a conduit;
   b. a plurality of electrically conductive longitudinally elongated members within said conduit;
      i. a first one of said elongated member having a central portion and respective extremity portions extending in a lateral direction therefrom, said extremity portions being respectively vertically oppositely offset relative to said central portion;
      ii. second ones of said elongated members having respective portions vertically offset from one another by an amount substantially that of offset of respective first member extremity portions relative to said central portion; and
      iii. third ones of said elongated members being of length in said lateral direction substantially that of said portions of said second ones of said elongated members and of said central and extremity portions of said first elongated member;
   said second members having respective portions insulatively overlapping said first member central portion on opposite sides; offsets of said second members being substantially aligned with respective offsets of said first member so that remaining portions of respective second members are proximate respective extremity portions of said first member; respective third members being substantially vertically aligned with said respective remaining portions of said second members and insulatively sandwiching respective remaining extremity portions of said second members between respective third members and respective extremity portions of said first member.

2. The bus of claim 1, wherein said first, second and third elongated members are mutually orthogonal.

3. A bus for longitudinally transmitting three-phase electrical power comprising:
   a. a plurality of electrically conductive longitudinally parallel and elongated lamina having transversely offset parts respecting one another;
   b. a plurality of electrically conductive longitudinally elongated lamina devoid of transverse offsets; and
   c. first and second ones of said pluralities of lamina extending longitudinally parallel with one another and being nested transversely together, each of said offsets being transversely aligned with an offset of another member of said first plurality and with a lateral extremity of a lamina of said second plurality.

4. The bus of claim 3 wherein said lamina carrying respective phases of said three-phase electrical power are in overlapping insulated sandwiched disposition with lamina carrying each of said phases having substantially equal transverse cross-sectional areas proximate the exterior of said lamina sandwich.

5. The bus of claim 3 wherein said lamina carrying respective phases of said three-phase electrical power are in vertically overlapping insulated sandwiched disposition with lamina carrying each of said phases having substantially equal transverse cross-sectional area at respective transverse locations within said lamina sandwich.

6. The bus of claim 5 wherein lamina of said second plurality extend transversely to the direction of offset substantially the same length as parts of lamina of said first plurality on respective sides of said offsets.

7. The bus of claim 6 wherein offset of respective parts of lamina of said first plurality are a given thickness and are vertically separated from said lamina of said second plurality greater than said thickness.

8. A modular direct current bus, comprising:
   a. an axially elongated conduit comprising a generally planar top, a generally planar bottom, said top having a right side and a left side, said bottom having a right side and a left side, said sides extending transversely to said planar top and said planar bottom, said top and bottom right sides in overlapping contacting engagement and said top and bottom left sides in overlapping contacting engagement fashion;
   b. axially elongated positive and negative conductive members within said conduit, said conductive members having generally planar and parallel upper and lower surfaces, and curved sides;
   c. axially elongated insulative means for maintaining said conductive members spaced from said conduit and from each other, comprising:
      i. an upper laterally elongated insulative block facingly contacting said planar top and said upper surface of said positive conductive member;
      ii. an intermediate laterally elongated insulative block facingly contacting said lower surface of said positive conductive member and said upper surface of said negative conductive member;
      iii. a lower laterally elongated insulative block facingly contacting said lower surface of said negative conductive member and said planar bottom;
      iv. two side vertically elongated blocks extending transverse said upper, intermediate and lower insulative blocks, both of said side blocks contacting said upper, intermediate and lower insulative blocks, said side blocks facingly contacting said planar top and said planar bottom, one of said side blocks facingly contacting said conduit right side, the remaining side block facingly contacting said conduit left side.

* * * * *